United States Patent
Rune

(10) Patent No.: US 10,512,066 B2
(45) Date of Patent: Dec. 17, 2019

(54) METHODS AND NODES RELATING TO AUTOMATIC NEIGHBOUR DETECTION

(71) Applicant: Telefonaktiebolaget LM Ericsson (publ), Stockholm (SE)

(72) Inventor: Johan Rune, Lidingö (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 121 days.

(21) Appl. No.: 15/535,955

(22) PCT Filed: Dec. 15, 2016

(86) PCT No.: PCT/SE2016/051274
§ 371 (c)(1),
(2) Date: Jun. 14, 2017

(87) PCT Pub. No.: WO2018/111163
PCT Pub. Date: Jun. 21, 2018

(65) Prior Publication Data
US 2018/0368135 A1 Dec. 20, 2018

(51) Int. Cl.
*H04W 72/04* (2009.01)
*H04W 76/10* (2018.01)
(Continued)

(52) U.S. Cl.
CPC ..... *H04W 72/0413* (2013.01); *H04W 56/001* (2013.01); *H04W 72/0453* (2013.01);
(Continued)

(58) Field of Classification Search
CPC ......... H04W 72/0413; H04W 72/0453; H04W 72/085; H04W 76/10–16;
(Continued)

(56) References Cited

U.S. PATENT DOCUMENTS 9,402,195 B2* 7/2016 Burley .................. H04W 24/02
2010/0317351 A1* 12/2010 Gerstenberger ........ H04W 8/26
455/443
(Continued)

FOREIGN PATENT DOCUMENTS

WO WO-2011139857 A1 * 11/2011 ........ H04W 36/0083
WO 2015144208 A1 10/2015
(Continued)

OTHER PUBLICATIONS

Ramachandra, Paradeepa et al. "On Automatic Establishment of Relations in 5G Radio Networks," IEEE 27th Annual International Symposium on Personal, Indoor and Mobile Radio Communications (PIMRC), Sep. 4-8, 2016, Valencia, Spain, IEEE, 6 pages.*
(Continued)

*Primary Examiner* — Afsar M Qureshi
(74) *Attorney, Agent, or Firm* — Withrow & Terranova, PLLC

(57) ABSTRACT

The first radio network node transmits a request to a core network node for initiation of the automatic neighbour detection. In response to the request, the core network node selects at least one second radio network node based on geographical information. The first radio network node also transmits, to the user equipment, an instruction to transmit an uplink signal. The user equipment transmits the uplink signal based on the instruction. The core network node transmits, to said at least one second radio network node, a command instructing said at least one second radio network node to listen for the uplink signal. In response to the command, the second radio network node listens for the uplink signal from the user equipment. Then, the second radio network node transmits, a message relating to whether the second radio network node is neighbouring to the first radio network node.

26 Claims, 10 Drawing Sheets

(51) Int. Cl.
    H04W 56/00    (2009.01)
    H04W 72/08    (2009.01)
    H04W 92/20    (2009.01)
(52) U.S. Cl.
    CPC ......... H04W 72/085 (2013.01); H04W 76/10
                 (2018.02); *H04W 92/20* (2013.01)
(58) Field of Classification Search
    CPC . H04W 56/00–0025; H04W 92/00–20; H04W
                 72/02; H04W 72/04; H04W 72/0426;
                 H04W 72/1284; H04W 24/02; H04W
                                                      88/02
    See application file for complete search history.

(56) References Cited

U.S. PATENT DOCUMENTS

| | | | | |
|---|---|---|---|---|
| 2012/0106370 | A1* | 5/2012 | Radulescu | H04W 36/0083 370/252 |
| 2012/0250521 | A1* | 10/2012 | Marinier | H04W 72/082 370/241 |
| 2014/0057628 | A1* | 2/2014 | Wong | H04W 24/02 455/424 |
| 2015/0264607 | A1* | 9/2015 | Chaudhuri | H04W 36/0061 455/436 |
| 2016/0029253 | A1* | 1/2016 | Sarkar | H04W 36/0016 455/436 |
| 2017/0331670 | A1* | 11/2017 | Parkvall | H04W 52/0274 |
| 2018/0249430 | A1* | 8/2018 | Moosavi | H04W 56/001 |
| 2018/0332513 | A1* | 11/2018 | Cao | H04W 36/00837 |

FOREIGN PATENT DOCUMENTS

| | | | |
|---|---|---|---|
| WO | 2015144256 | A1 | 10/2015 |
| WO | 2015188861 | A1 | 12/2015 |
| WO | 2018009111 | A1 | 1/2018 |
| WO | 2018053748 | A1 | 3/2018 |
| WO | WO-2018080356 | A1 * | 5/2018 |

OTHER PUBLICATIONS

Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," Technical Specification 36.300, Version 14.0.0, 3GPP Organizational Partners, Sep. 2016, 314 pages.

Sahlin, Henrik et al., "Random Access Preamble Format for Systems with Many Antennas," Globecom 2014 Workshop—Emerging Technologies for 5G Wireless Cellular Networks, Dec. 8-12, 2014, Austin, TX, USA, IEEE, pp. 875-880.

Ericsson, "R3-161902: Automatic base station relations in NR," 3rd Generation Partnership Project (3GPP), TSG-RAN WG3 #93, Aug. 22-26, 2016, 3 pages, Gothenburg, Sweden.

Ericsson, "R3-161998: TP on Automatic base station relations in NR," 3rd Generation Partnership Project (3GPP), TSG-RAN WG3 #93, Aug. 22-26, 2016, 1 page, Gothenburg, Sweden.

Fiberhome Technologies Group, "R2-132295: Small cell discovery in HetNet based on existed uplink signal," 3rd Generation Partnership Project (3GPP), TSG-RAN WG2 #83, Aug. 19-23, 2013, 4 pages, Barcelona, Spain.

Itri, et al., "R2-116260: Improvement for small cell discovery and identification," 3rd Generation Partnership Project (3GPP), TSG-RAN WG2 #76, Nov. 14-18, 2011, 2 pages, San Francisco, USA.

Itri, "R2-122671: Network based small cell discovery and identification," 3rd Generation Partnership Project (3GPP), TSG-RAN WG2 #78, May 21-25, 2012, 2 pages, Prague, Czech Republic.

Ramachandra, Pradeepa et al., "On Automatic Establishment of Relations in 5G Radio Networks," IEEE 27th Annual International Symposium on Personal, Indoor, and Mobile Radio Communications (PIMRC), Sep. 4-8, 2016, Valencia, Spain, IEEE, 6 pages.

International Search Report and Written Opinion for International Patent Application No. PCT/SE2016/051274, dated Aug. 16, 2017, 19 pages.

* cited by examiner

METHODS AND NODES RELATING TO AUTOMATIC NEIGHBOUR DETECTION

This application is a 35 U.S.C. § 371 national phase filing of International Application No. PCT/SE2016/051274, filed Dec. 15, 2016, the disclosure of which is incorporated herein by reference in its entirety.

TECHNICAL FIELD

Embodiments herein relate to wireless communication systems, such as telecommunication systems and the like. In particular, a method and a first radio network node for automatic neighbour detection, a method and a user equipment for assisting the first radio network node with automatic neighbour detection, a method and a core network node for enabling the first radio network node to perform automatic neighbour detection as well as a method and a second radio network node for enabling automatic neighbour detection performed by the first radio network node are disclosed. Corresponding computer programs and computer program carriers are also disclosed.

BACKGROUND

Some wireless communication systems, such as Long Term Evolution (LTE) system, utilize a concept referred to as Automatic Neighbour Relations (ANR). Similar concepts also exist for other cellular radio communication systems, such as Global System for Mobile communications (GSM), Code Division Multiple Access (CDMA) or the like. In LTE, ANR enables automatic discovery of neighbour relations between cells and between so called evolved-NodeBs (eNBs), commonly referred to as base stations. A purpose of ANR is to identify and establish interfaces to those of the discovered neighbours that are deemed appropriate according to various measures. Thanks to the interfaces, such as inter-eNB interfaces referred to as X2 interfaces in LTE, neighbour parameters can be configured. The neighbour parameters, such as threshold values and/or measurement values of signal strength, path-loss, Signal-To-Interference-and-Noise-ratio etc., may be used for e.g. handover, Coordinated Multi-Point (CoMP) transmission, Inter-Cell Interference Coordination (ICIC), load balancing or the like.

The concept of ANR includes that an eNB requests a user equipment (UE) to measure on and read Physical Cell Identities (PCIs) of nearby cells as well as to measure on and read at least parts of system information broadcast by those nearby cells. The PCIs and/or the parts of the system information are reported back to the eNB by the UE. Thanks to the PCIs and/or the parts of the system information, the eNB can determine whether or not any of the nearby cells are indeed suitable as neighbours and the eNBs can also automatically establish a relationship and an X2 interface between involved eNBs when needed. ANR in LTE is further described in chapter 22.3.3 in Third Generation Partnership Project (3GPP) Technical Specification (TS) 36.300.

Above, the concept of ANR has been described in relation to a $4^{th}$ generation (4G) telecommunication system, such as LTE. However, a similar feature as ANR would be equally useful and beneficial in a $5^{th}$ generation (5G) system.

A difference between the 4G and 5G systems relates to frequency bands that can be used. The frequency band used has implications for design of the 5G systems. Due to expected lack of available radio spectrum, frequency bands located at very high frequencies, such as 10 GHz and above, are planned to be utilized for future mobile communication systems, including the 5G systems. Attenuation of radio signals at these very high frequencies can be much greater than attenuation of radio signals at lower frequencies. Amount of the attenuation may be affected by e.g. atmospheric penetration properties, diffraction properties and the like.

As a consequence of the very high frequencies, energy of radio signals in these future mobile communication systems will increase, since energy is proportional to frequency according to the well-known Planck-Einstein relation. Increased energy of radio signals will in turn cause a measure of receiver antenna aperture to decrease, since the receiver antenna aperture is inversely proportional to energy per area unit of the radio signals. The receiver antenna aperture describes effective receiver antenna area collecting electromagnetic energy from an incoming electromagnetic wave, such as the radio signals. This means that due to decreased receiver antenna aperture, a link budget for a transmission becomes worse—even in a free space scenario disregarding the aforementioned attenuation at the very high frequencies—while it is assumed that omnidirectional receive and transmit antennas are used. The link budget accounts for gains and losses of a radio signal transmitted, by a transmitter, through e.g. the atmosphere or even free space, and received at a receiver, while considering e.g. the receiver antenna aperture.

Instead of using omnidirectional antennas, the 5G system are capable of using antennas adapted to provide beamforming, whereby loss of link budget at the very high frequencies may be compensated for. Beamforming may be used at the transmitter, at the receiver, or both. In a large part of the radio spectrum for 5G systems, the preferred configuration is to use a large antenna array at an Access Node (AN) and a small number of antennas at the UE. The large antenna array at the AN enables high-order transmit beamforming in the downlink and the small number of antennas at the UE enables some low-order transmit beamforming.

For these reasons, e.g. 5G systems are expected to make heavy use of high-gain and narrow beamforming to provide transmission at high data rates and enhanced coverage. For example, thanks to the beamforming a distant user may be served at a high data rate, while the distant user would otherwise not be realistically covered with normal sector-wide beams, i.e. without high-gain and narrow beamforming.

Another difference between 5G and 4G systems is that for 5G systems a lean design principle is emphasized more and much better energy efficiency is required. The lean design principle favours attempts to avoid always-on transmissions for the purpose of energy efficiency.

In view of the above, a problem may be related to how to adapt ANR of LTE to the 5G systems.

SUMMARY

An object may thus be to adapt and/or improve procedures relating to ANR for the above mentioned 5G systems or the like.

According to an aspect, the object is achieved by a method, performed by a first radio network node, for automatic neighbour detection. The first radio network node transmits a request to a core network node for initiation of the automatic neighbour detection. Furthermore, the first radio network node transmits, to a user equipment, an instruction to transmit an uplink signal. Moreover, the first radio network node receives a message relating to whether at least one second radio network node is neighbouring to the first radio network node.

According to yet another aspect, the object is achieved by a first radio network node configured for automatic neighbour detection. The first radio network node is configured for transmitting a request to a core network node for initiation of the automatic neighbour detection. Moreover, the first radio network node is configured for transmitting, to a user equipment, an instruction to transmit an uplink signal. The first radio network node is configured for receiving a message relating to whether at least one second radio network node is neighbouring to the first radio network node.

According to another aspect, the object is achieved by a method, performed by a user equipment, for assisting a first radio network node with automatic neighbour detection. The user equipment receives, from the first radio network node, an instruction about at least one resource for a transmission of an uplink signal. Additionally, the user equipment transmits, on at least said at least one resource, the uplink signal based on the instructions.

According to a yet further aspect, the object is achieved by a user equipment configured for assisting a first radio network node with automatic neighbour detection. The user equipment is configured for receiving, from the first radio network node, an instruction about at least one resource for a transmission of an uplink signal. Furthermore, the user equipment is configured for transmitting, on at least said at least one resource, the uplink signal based on the instructions.

According to a further aspect, the object is achieved by a method, performed by a core network node, for enabling a first radio network node to perform automatic neighbour detection. The core network node receives a request from the first radio network node for initiation of automatic neighbour detection. Moreover, the core network node selects at least one second radio network node based at least in part on geographical information relating to said at least one second radio network node in relation to geographical information related to the first radio network node. Additionally, the core network node transmits, to said at least one second radio network node, a command instructing said at least one second radio network node to listen for the uplink signal.

According to a still other aspect, the object is achieved by a core network node configured for enabling a first radio network node to perform automatic neighbour detection. The core network node is configured for receiving a request from the first radio network node for initiation of automatic neighbour detection. Additionally, the core network node is configured for selecting at least one second radio network node based at least in part on geographical information relating to said at least one second radio network node in relation to geographical information related to the first radio network node. The core network node is configured for transmitting, to said at least one second radio network node, a command instructing said at least one second radio network node to listen for the uplink signal.

According to a still further aspect, the object is achieved by a method, performed by a second radio network node, for enabling automatic neighbour detection performed by a first radio network node. The second radio network node receives, from a core network node, a command instructing the second radio network node to listen for an uplink signal to be transmitted by a user equipment served by the first radio network node receives the uplink signal from the user equipment. Furthermore, the second radio network node transmits, a message relating to whether the second radio network node is neighbouring to the first radio network node.

According to a yet other aspect, the object is achieved by a second radio network node configured for enabling automatic neighbour detection performed by a first radio network node. The second radio network node is configured for receiving, from a core network node, a command instructing the second radio network node to listen for an uplink signal to be transmitted by a user equipment served by the first radio network node is configured for receiving the uplink signal from the user equipment. Moreover, the second radio network node is configured for transmitting, a message relating to whether the second radio network node is neighbouring to the first radio network node.

According to further aspects, the object is achieved by computer programs and computer program carriers corresponding to the aspects above.

Accordingly, the first radio network node initiates the automatic neighbour detection by transmitting the request to the core network node. In response to the request, the core network node may select and/or transmit the command instructing said at least one second radio network node to search for, e.g. to listen for, the uplink signal in order to obtain a measurement result relating to whether or not said at least one second radio network node is suitable as being a neighbour to the first radio network node. This may mean that said at least one second radio network node is configured with information relating to the automatic neighbour detection. The information may comprise at least one resource on which the uplink signal is to be transmitted. In order for the uplink signal to be sent, the first radio network node transmits, to the user equipment, the instruction to transmit the uplink signal. Upon reception of the instruction, the user equipment transmits the uplink signal based on the instructions, which e.g. may include information about said at least one resource.

Thereafter, the second radio network node may or may not have detected, e.g. received, the uplink signal. When the uplink signal is received, the second radio network node may obtain the measurement result mentioned above in this paragraph. E.g. based on the measurement result, the second radio network node may or may not send the message relating to whether at least one second radio network node is neighbouring to the first radio network node.

If the message has been sent, the first radio network node receives the message. As a result, the first radio network node may perform automatic neighbour detection based on measurement(s), performed by said at least one second radio network node, on the uplink signal transmitted by the user equipment.

An advantage is that automatic neighbour detection may be performed efficiently, e.g. in terms of radio resources used, also in systems applying beamforming.

Moreover, the embodiments herein meets the lean design principle, mentioned in the background section, by not requiring any always-on signals—at least not any always-on signals for the purpose of automatic neighbour detection—to be transmitted.

Furthermore, the embodiments herein avoid transmission of stable/static identifiers which may be associated with nodes, such as the first and/or second radio network node, the user equipment or the like, or locations, over the air. Thus, it may be prevented that Over-The-Top (OTT) applications utilize the identifiers for location related services. It shall be said that the embodiments herein do at least not introduce any such identifiers for the purpose of ANR.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
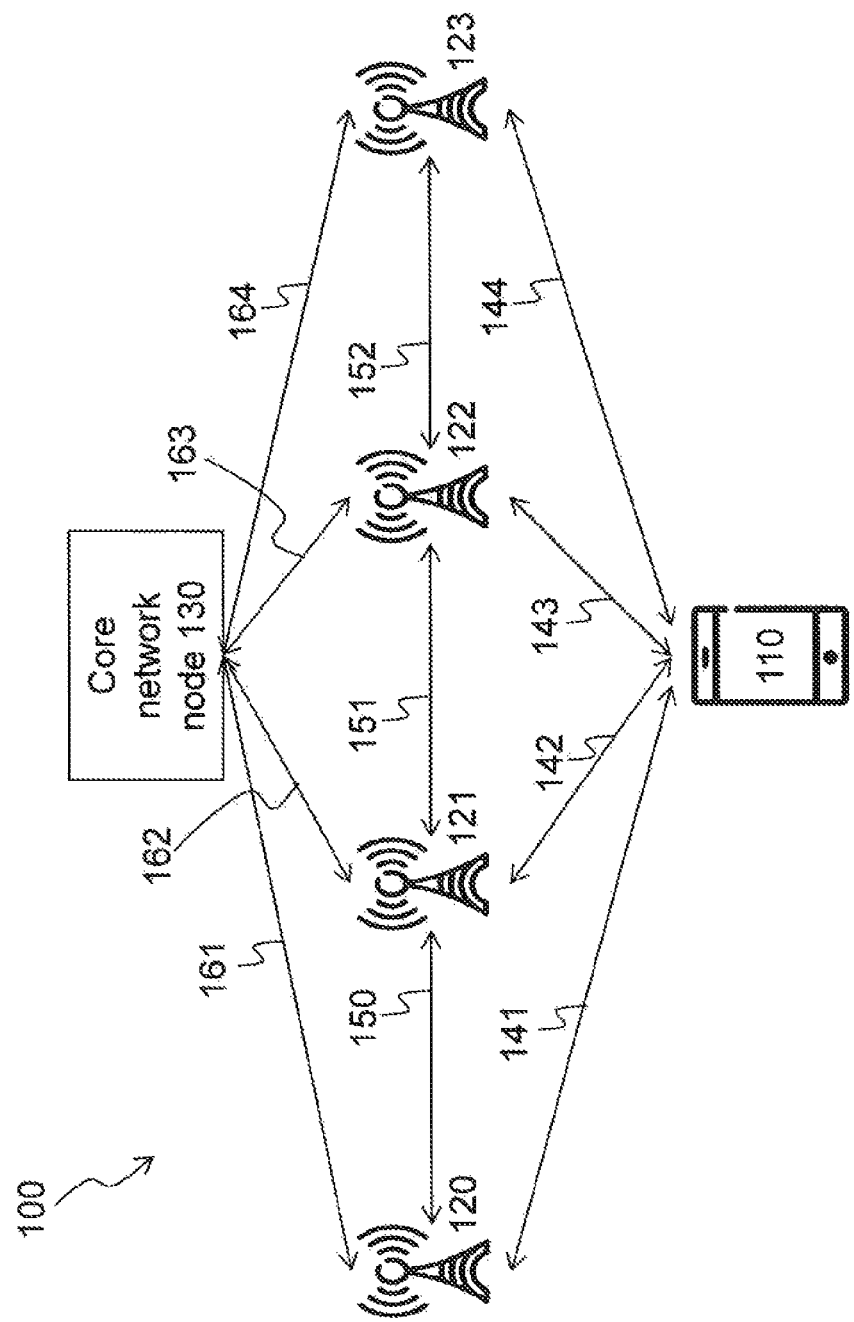
FIG. 1 is a schematic overview of an exemplifying system in which embodiments herein may be implemented.

In order to better appreciate the embodiments herein, the following analysis is provided.

In general, both DownLink (DL) and UpLink (UL) signals may be used for measurement in wireless communication networks, e.g. for estimation of the channel quality. DL signals have traditionally been the most commonly used signals for channel quality measurements for handover decisions and DL signals are also used for supporting ANR in 4G. However, with high frequencies where beamforming is more extensively used, utilization of UL signals for measurements have some advantages, as will be illustrated below.

As mentioned in the background section, very high frequencies are expected to be commonly used for 5G systems, which—to cope with various challenges due to the very high frequencies—include advanced antenna systems to a large extent. With such advanced antenna systems, radio signals may as mentioned be transmitted in narrow beams to increase signal strength and coverage in some directions, and/or to reduce interference in other directions. Continuously transmitting pilot signals in all directions for all beams is then less attractive, since the pilot signals generate interference and also increase energy consumption of a transmitter, such as a base station. In addition, the aforementioned lean design principle would be disregarded at least to some degree. This means that beamforming may be heavily used in the 5G systems.

The beamforming of DL pilot signals also has implications for measurements for handover preparation. During a handover, maintenance of good Signal-To-Noise-Ratio (SNR) and high bit rates require that a UE is handed over from one beam to another beam. In addition, in the high frequencies considered for 5G systems, radio propagation properties, e.g. low diffraction and poor penetration, suitability of a certain beam may be quite sensitive to rather small movements and even rotations of the UE. Hence, how to determine which beam to hand over a UE to may not be easy. In order to determine which beam would be suitable, the UE may have to perform a beam finding procedure with which suitability of different beams may be evaluated and a suitable beam identified. During the beam finding procedure access nodes, such as base stations, that are capable of transmitting potential target beams for the handover, transmit their DL beams for the UE to measure on. The DL beams may be identified by downlink signals, such as synchronization and/or reference signals. Furthermore, the DL beams are typically sequentially transmitted in a manner usually referred to as a beam sweep. The beam sweep may be continuously repeated or activated on demand. The UE searches for the downlink signals identifying the DL beams transmitted in the beam sweep and measures a respective quality of each downlink signal. The DL beam corresponding to a best quality is typically selected as a target beam of the handover.

As implied initially in the detailed description, in a 5G system with advanced antennas, utilization of UL signals may have some attractive advantages, e.g. for the purpose of handover. As mentioned, existing telecommunication radio access networks may rely on uplink measurements. For example, a UE transmits an uplink signal and several network nodes measure on the transmitted uplink signal. The uplink signal may be a sounding signal, a reference signal or a combined synchronization and reference signal or the like.

A reason that makes UL measurement based handover more attractive in systems with advanced antennas is differences relating UL and DL link budgets. Since the access node typically has more antennas and more advanced antenna configurations and receiver than the UE, antenna and receiver gain of the access node is higher than antenna and receiver gain of the UE. Thus, the UL link budget is more favourable than the DL link budget.

Accordingly, beamforming of the transmission of the uplink signal used for UL measurement based handover is not as crucial as for handover based on DL measurement using the DL beam sweeps as described above. Typically, a single omnidirectional uplink signal transmission, or possibly a beam sweep consisting of a few wide UL beams, suffices to reach and provide a measurement opportunity for all candidate access nodes, i.e. being candidates for acting as targets of the handover.

Furthermore, an additional benefit of handover based on UL measurement compared handover based on DL measurement is that the access node that receives the uplink signal from the UE may estimate the DL quality based on UL/DL reciprocity, especially in Time Division Duplex (TDD) deployments which are expected to prevail in 5G systems with high frequencies.

The handover based on UL measurement begin with initiation of uplink signal transmission from the UE in order to make it possible for candidate cells/access nodes to measure on the uplink signal transmission. Measurements of quality of received uplink signal transmission from the UE are performed at each candidate cell/access node. Then, the measurements from the candidate cells/access nodes are collected and compared and the network decides on a suitable target cell/access node. A decision about the suitable target cell/access node is communicated to the UE.

An UL signal used for measurement in wireless communications systems, such as 5G systems, may be designed as an Uplink Synchronization Signal (USS), similar to a Physical Random Access Channel (PRACH) signal, e.g. a random access preamble. Such a signal may be used both for synchronization and channel quality measurements. The USS may occupy one subframe, or timeslot/Transmission Time Interval (TTI), of length 1 ms and consists of 14 standard-length Orthogonal Frequency Division Multiplexing (OFDM) symbols that repeat a single identification sequence, e.g. a Zadoff-Chu sequence. Note that depending on a so called numerology, which e.g. impacts the timeslot/TTI length, the USS may be compressed to fit in shorter subframes and symbol lengths without deviating from the described structure. At the access node receiver, each symbol in a subframe carrying the USS is individually converted to frequency domain and matched filters are applied to detect, potentially one of several, USS sequences. Matched filter outputs are accumulated over the subframe and an Inverse Fast Fourier Transform (IFFT) is applied, at the output of which a time domain peak appears. Delay of the time domain peak corresponds to the timing error. The signal design allows reception and timing estimation with only rough initial timing alignment, aka time synchronization.

A not yet publicly available ANR solution based on DL signals has been proposed for 5G. In this solution, beamformed DL signals are transmitted from potential neighbour access nodes on-demand. Thanks to that the beamformed DL signal are transmitted on demand, the lean design principle in complied with. The beamformed DL signals may require multiple beamformed DL signals, e.g. in different directions or different widths, from each involved access node in order for the UE to be able to detect a suitable beam.

However, the issues associated with DL measurement handover, i.e. the need to transmit multiple beamformed DL signals, e.g. a beam sweep, in order to allow the UE to find, detect and measure on the USS is also relevant for ANR. A problem of the ANR solution briefly mentioned directly above may be how to improve ANR, e.g. in terms of resource efficiency and/or number of USS required to be transmitted.

Throughout the following description similar reference numerals have been used to denote similar features, such as nodes, actions, modules, circuits, parts, items, elements, units or the like, when applicable. In the Figures, features that appear in some embodiments are indicated by dashed lines.

FIG. 1 depicts an exemplifying system 100 in which embodiments herein may be implemented. In this example, the system 100 is a so called 5G system, which may be an evolution of e.g. a Long Term Evolution (LTE) system or the like.

In other examples, system 100 may for example be a network such as Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, or a Wideband Code Division Multiple Access (WCDMA), Universal Terrestrial Radio Access (UTRA) TDD, Ultra-Mobile Broadband (UMB), Global System for Mobile communications (GSM) network, GSM/Enhanced Data Rate for GSM Evolution (EDGE) Radio Access Network (GERAN) network, EDGE network, a network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), 5G system or any cellular network or system.

The system 100 may be said to comprise a user equipment 110. This means that the user equipment 110 is present in the system 100, e.g. within coverage of the system 100.

Furthermore, a first radio network node 120 and at least one second radio network node 121-123 are shown in FIG. 1. The system 100 may comprise the first radio network node 120 and said at least one second radio network node 121-123.

Moreover, a first set of radio network nodes 121 is shown in FIG. 1. The first set of radio network nodes 121 is shown as only one radio network node for reasons of simplicity, but the first set of radio network nodes 121 may of course comprise one or more radio network nodes. The first set of radio network nodes 121 are identified as neighbouring to the first radio network node 120 as indicated by so called ANR information, such an ANR list or the like. The first set of radio network nodes 121 may be referred to as existing neighbours to the first radio network node 120.

Furthermore, a second set of radio network nodes 121-123, aka said at least one second radio network node 121-123, which may or may not comprise any one or more of the first set of radio network nodes 121 or may or may not comprise any one or more of a third set of radio network nodes 122-123. This means that each radio network node of the second set of radio network nodes 121-123 belong to either the first set of radio network nodes 121 or the third set of radio network nodes 122-123. None of the radio network nodes of the third set is included in the first set of radio network nodes 121. That is to say, the third set of radio network nodes 122-123 are not identified as neighbouring to the first radio network node 120, e.g. as indicated by the ANR information as mentioned above. The third set of radio network nodes 122-123 may be referred to as potential neighbours to the first radio network node 120. Accordingly, the second set of radio network nodes 121-123 may be referred as existing and potential neighbours.

In the upper portion of FIG. 1, there is shown a core network node 130, which may comprise one or more of a Mobility Management Entity (MME), Operations and Maintenance (O&M) system, a node for maintaining ANR information, and the like. Operations, or actions, performed by the core network node 130 as will be described in the following may involve more than one core network node, e.g. at least one MME. This typically applies when not all the radio network nodes discussed herein are connected to the same core network node, e.g. the same MME. In such a case, the operations will involve inter-core network node communication, mainly in the form of relaying/forwarding the information, messages, commands etc. as described herein, between each other.

The radio network nodes 120-123 may communicate 141-144 with the user equipment 110.

Each of the radio network nodes 120-123 may also communicate 150-152 (only a few exemplifying arrows are shown) with each other. Communication between the radio network nodes 120-123 may be achieved through X2 interface or similar inter-'radio network node' interface. Alternatively or additionally, communication between the radio network nodes 120-123 may be achieved via the core network node 130 through a 'core network node'-interface, such as S1 interface or the like.

Accordingly, each of the radio network nodes 120-123 may communicate 161-164 with the core network node 130.

The communication discussed above may include user transmissions and/or control transmissions. The user transmissions may include user data, payload data, content data etc. The control transmissions may include control information relating to e.g. scheduling, authentication, mobility, transmit power etc. The communication may include uplink transmission and/or downlink transmission. A transmission may be referred to as a data block.

As used herein, the term "radio network node" may refer to a Base Station System (BSS), a Radio Network Controller (RNC), a Radio Base Station (RBS), an evolved Node B (eNB), a control node controlling one or more Remote Radio Units (RRUs), an access point or the like.

As used herein, the term "user equipment" may refer to a wireless communication device, a machine-to-machine (M2M) device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The term "user" may indirectly refer to the wireless device. Sometimes, the term "user" may be used to refer to the user equipment or the like as above. It shall be understood that the user may not necessarily involve a human user. The term "user" may also refer to a machine, a software component or the like using certain functions, methods and similar.

The embodiments herein are based on an observation that the above described differences between DL and UL signals in terms of link budget and number of beams required for finding, detecting and measuring on beamformed signals can be leveraged for automatic neighbour detection.

Accordingly, in contrast to the aforementioned not yet publicly available ANR solution based on DL signals, the embodiments here make advantageous use of one or more UL signals instead of DL signals, which—partly due to the difference in UL and DL link budget—results in better resource efficiency, because fewer transmissions of the uplink signal(s) are required as compared to number of downlink transmissions, or number of downlink beams.

As an overview, one exemplifying method will be described with reference to FIG. 1. The embodiments herein perform and/or enable automatic neighbour detection, e.g. by verifying and/or modifying ANR information based on e.g. at least one measurement on at least one transmission of an uplink signal, e.g. for automatic neighbour detection, from the user equipment. The ANR information may include a list of radio network node identities, such as a Physical Cell Identities or the like, which identifies the first set of radio network nodes that are considered to be neighbours to the first radio network node. The automatic neighbour detection may be exemplified as neighbour detection, i.e. detection of neighbours to the first radio network node.

Said at least one measurement is performed by said at least one second radio network node 121-123, i.e. by those radio network nodes that may be evaluated with respect to being or not being suitable as a neighbour to the first radio network nodes. Expressed differently, it is evaluated whether or not these radio network nodes, i.e. the identities thereof, are to be included among the ANR information or not.

The first radio network node 120 initiates automatic neighbour detection by sending a request to the core network node 130. The core network node 130 then selects one or more potential neighbour radio network nodes, such as said at least one second radio network node 121-123, that is requested to listen for an uplink signal to determine if they are indeed neighbouring the first radio network node 120 and thus candidates for communication interface establishment. Typically, the communication interface is a so called X2 or eX2 interface known for 3GPP terminology, where eX2 refers to an inter-radio network node interface in the 5G radio network denoted New Radio (NR) currently being specified by 3GPP.

But before the uplink signal can be sent, the first radio network node 120 may select a suitable UE, such as the user equipment 110, to assist with the automatic neighbour detection. In this manner, the first radio network node may instruct the user equipment 110 about on which resource, e.g. subframe and/or subcarrier and/or the like, the uplink signal is to be sent.

When the uplink signal has been sent, said at least one second radio network node 121-123 may receive and decode the uplink signal. Said at least one second radio network node 121-123 may then, with or without consideration of e.g. signal strength of the received uplink signal, send a message, e.g. via the core network node 130, to the first radio network node 120. The message may also be sent even if no uplink signal has been received. In this case, the message may indicate that one of said at least one second radio network node 121-123 that sent the message, is not suitable as a neighbour to the first radio network node 120. In this manner, the first radio network node 120 is informed about that said at least one second radio network node 121-123 is suitable as being a neighbour to the first radio network node 120, and sometimes that said at least one second radio network node 121-123 is not suitable as being a neighbour to the first radio network node 120.

As a result, the embodiments herein are improvements, e.g. in terms of efficient use of time/frequency radio resources, of the not yet publicly available ANR solution, e.g. in that the embodiments herein avoid beam sweeping and avoid relying on frequently transmitted so called "always on" signals. An advantage is hence that the user equipment 110 may send one or a few uplink signals as compared to sending a beam sweep.

As mentioned in the background section, "neighbour" and/or "neighbouring" may refer to that the second radio network node is suitable as a neighbour to the first radio network node, e.g. because the measurement—referred to as said at least one measurement in the overview above—exceeded a threshold relating to channel quality mentioned, path loss, signal strength, Signal-To-Noise-Ratio, Signal-To-Noise-and-Interference-Ratio, Signal-To-Interference-Ratio and the like. Hence, as used herein the terms "neighbour" and/or "neighbouring" may mean that when the user equipment, e.g. served by a first cell managed by the first radio network node, is located at an edge of the first cell, a second cell that is neighbouring to the first cell may receive the uplink signal from the user equipment with sufficiently high quality, e.g. above the aforementioned threshold. This may also mean that neighbours to the first cell may be suitable for handover, ICIC, CoMP and the like.

Figure 2:
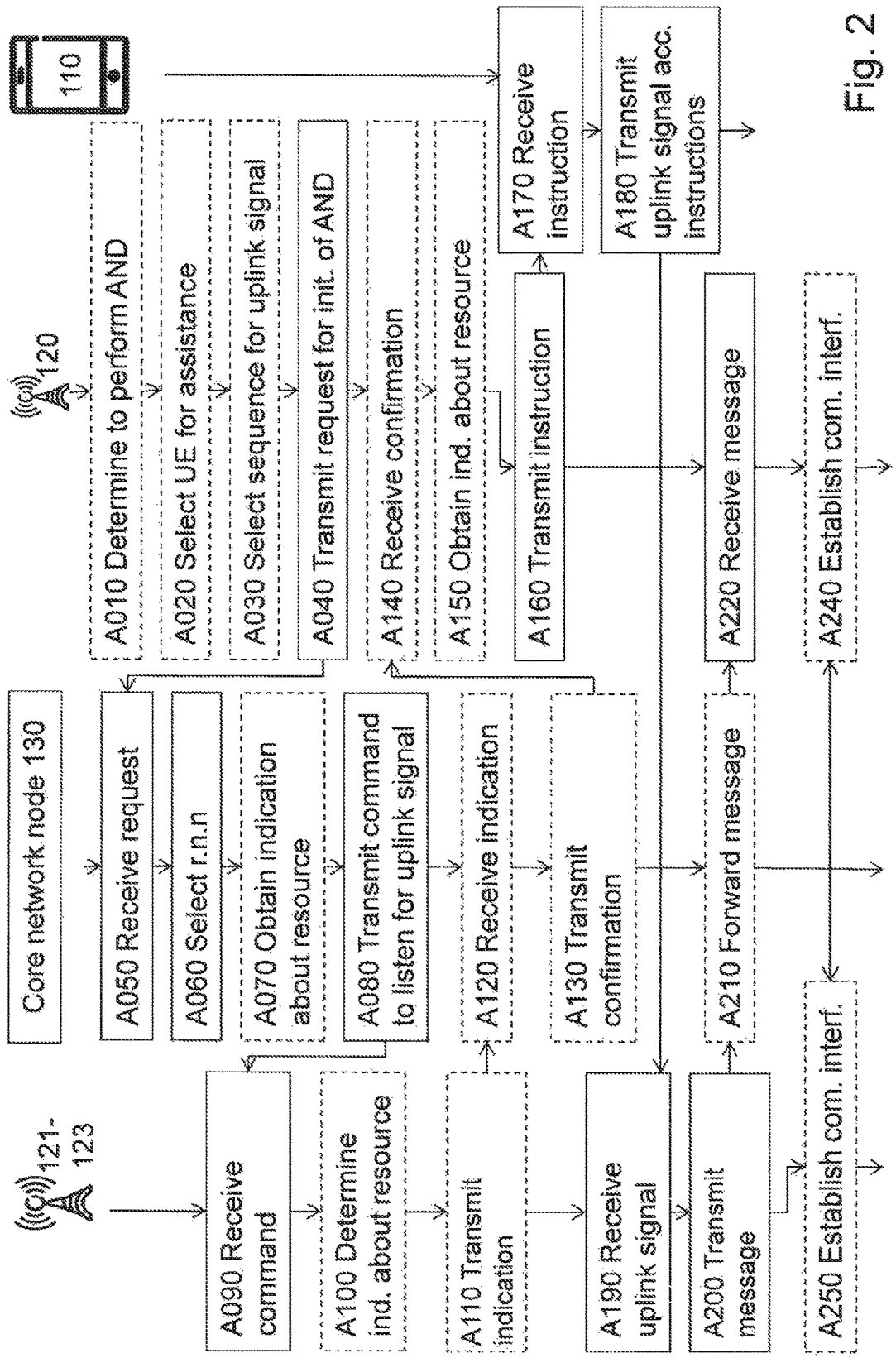
FIG. 2 is a combined signalling and flowchart illustrating exemplifying methods herein.

FIG. 2 illustrates exemplifying methods according to embodiments herein when implemented in the system 100 of FIG. 1. The exemplifying methods are performed by the first radio network node 120, the user equipment 110, the core network node 130 and the second radio network node 121-123, respectively. In the following, the exemplifying methods are described separately.

Hence, an exemplifying method performed by the first radio network node 120 will now be described with reference to FIG. 2 and FIG. 3. The first radio network node 120 performs a method for automatic neighbour detection.

One or more of the following actions may be performed in any suitable order.

Action A010

Initially, the first radio network node 120 may determine to perform the automatic neighbour detection (AND). This action may be performed periodically, non-periodically, or e.g. in response to detection of newly deployed radio network nodes. Sometimes, the first radio network node 120 may have been configured to initiate the automatic neighbour detection periodically by the core network node.

As an example, the first radio network node 120 may be triggered to initiate the automatic neighbour detection by a specific condition.

The specific condition may relate to that the first radio network node 120 has detected, or received information about, that radio network nodes have been deployed, or installed, in the vicinity thereof. The specific condition may be related to detection of changes in the radio environment, changed transmission properties, e.g. due to changed antenna tilts or changed transmit power, of other radio network nodes in the vicinity of the first radio network node 120 or the like.

It may also be that the core network node 130, such as O&M system, requests the first radio network node 120 to perform automatic neighbour detection regularly or irregularly.

Action A020

In order to make use of uplink signals, the first radio network node 120 may select the user equipment 110, e.g. served by the first radio network node 120, to assist with the automatic neighbour detection.

The first radio network node 120 may select the user equipment 110 from a group of user equipments located at an edge of a cell, the cell being operated by the first radio network node 120. The cell may have a coverage area, in which case it may be said that the user equipment 110 may preferably be located at the periphery of the coverage area, i.e. typically far away for the first radio network node 120. The user equipment 110 may also be located at the periphery or edge of the area in which the first radio network node 120 provides radio coverage.

Expressed differently, the selected UE 110 may be selected from among all UEs currently connected to, or served by, the first radio network node 120. It may be preferred that the selected UE 110 is located close to an edge of a coverage area of the first radio network node 120. The coverage area may sometimes be referred to as service area. If the selected UE 110 is not in connected mode, the first radio network node 120 may instruct the UE 110 to, e.g. leave idle mode, and enter connected mode.

In this fashion, the selected UE becomes designated to assist, or aid, the first radio network node 120 with the automatic neighbour detection. As an example, thanks to the automatic neighbour detection, neighbours suitable for handover may be identified.

The selected UE 110 may have a capability to transmit transmissions omni-directionally, close to omni-directionally or using wide beams. Information about such capability may be included in so called capability information, which e.g. may be conveyed from the UE 110 to the first radio network node 120 in conjunction with an attach procedure, and/or the information about capability may be requested in any other procedure being separate from the attach procedure. The attach procedure is known in the art and is not described here for brevity.

There may be a transmit power capability condition that the UE 110 should be able to achieve an omnidirectional, or an almost omnidirectional, transmission having a power density, i.e. power per solid angle, exceeding a certain threshold. The transmit power capability condition may be included in the capability information, or it may be retrieved from the UE on demand.

Figure 3:
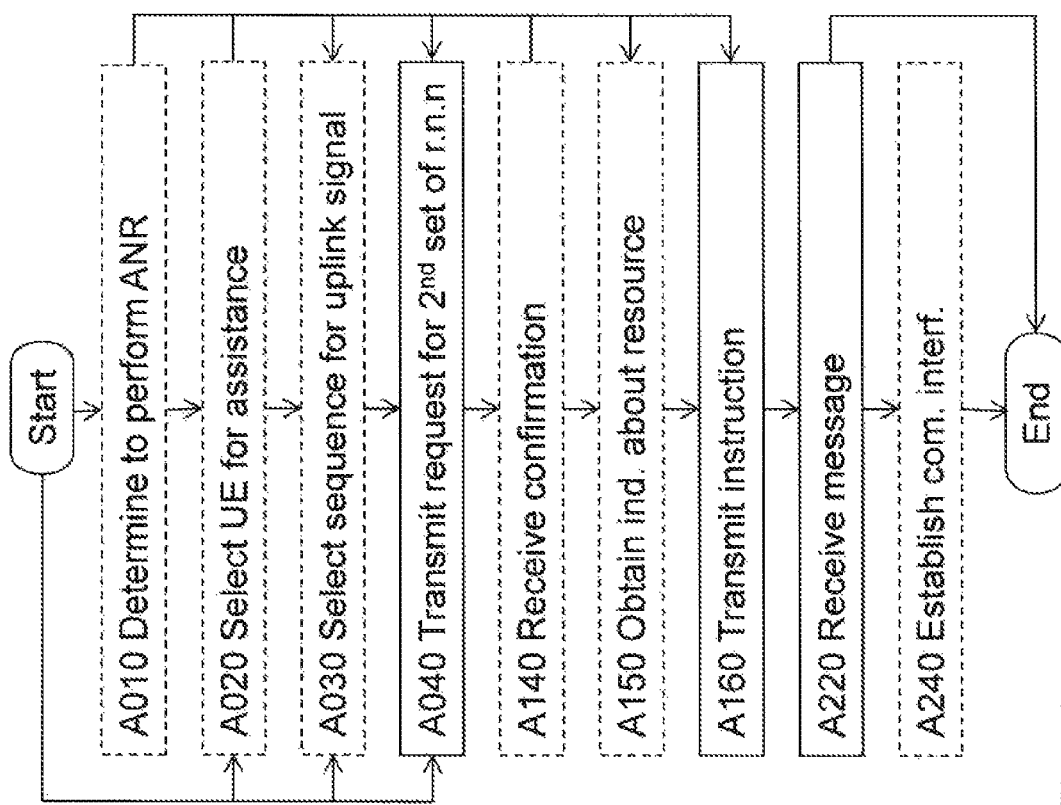
FIG. 3 is a flowchart illustrating embodiments of the method in the first radio network node.

In case no suitable UE is found, the first radio network node 120 may still proceed with at least some actions of FIG. 2 and/or FIG. 3. For example, the first radio network node 120 may prepare the core network node 130 and said at least one second radio network node 121-123 such that when the first radio network node 120 detects a suitable UE, the automatic neighbour detection may begin, e.g. by sending a short triggering message to the core network node 130 and said at least one second radio network node 121-123. Alternatively or additionally, the core network node 130 and said at least one second radio network node 121-123 stays prepared for reception of an uplink signal until at least one report has been forwarded to the first radio network node 120 or a time period has expired. In order to attempt to ensure that at least one report is forwarded by the core network node 130, one or more of the existing neighbours may be included among said at least one second radio network node 121-123. This means that action A020 may be omitted in some embodiments.

Action A030

In case there are multiple automatic neighbour detections going on or if there is no default sequence for representation of the uplink signal, the first radio network node 120 may select a sequence for representing the uplink signal e.g. from a set of uplink synchronization sequences.

The sequence may be a dedicated uplink sequence, such as an Uplink Synchronization Sequence (USS). The sequence may be a single sequence which may be predetermined, pre-configured, statically or semi-statically configured or the like. Alternatively, the sequence may be one out of a set of sequences. The set of sequences may include one or more dedicated sequences, e.g. USS sequences, which may be set aside to be used only for the automatic neighbour detection, or so called ANR session(s). Similarly to the single sequence, the dedicated sequences for the uplink signal may also be predetermined, pre-configured, statically or semi-statically configured.

Action A040

In order to make the core network node 130 aware of that the first radio network node 120 wishes to perform automatic neighbour detection, the first radio network node 120 transmits a request to a core network node 130 for initiation (init.) of the automatic neighbour detection. The request may comprise an indication of zero or more of said at least one second radio network node 121-123.

Moreover, the request may comprise at least one of:

information relating to synchronization with respect to the first radio network node 120 and/or the user equipment 110, an indication about at least one resource for transmission of the uplink signal, Information relating to multiplicity of allocations for transmission of the uplink signal, contact information relating to the first radio network node 120 for establishment of communication interface, information relating to at least one condition for transmission of the message, information relating to format and/or contents of the message, an indication about a time window for transmission of the uplink signal, an estimate of the user equipment's 110 position, and the like.

Each item of the list above will now be described in more detail.

The information relating synchronization with respect to the first radio network node 120 and/or the user equipment 110 may aid the core network node 130 in estimating synchronization of the first radio network node 120, or inter-node synchronization inaccuracy in general, and/or the user equipment 110. The information may include timing information, such as a timestamp of the transmission time of the request message, and/or information about difference between synchronization of the first radio network node 120 and the assisting user equipment 110.

The indication about at least one resource for transmission of the uplink signal may indicate a subcarrier and/or a subframe and/or the like, which may be indicated by subcarrier indices, subframe numbers, etc.

The information relating to multiplicity of allocations for transmission of the uplink signal may indicate whether resources should be allocated for multiple transmission of the uplink signal or for only one transmission of the uplink signal. Multiple transmissions may be useful when the assisting user equipment 110 needs multiple transmissions to cover an entire sphere, typically in case omni-directional transmission is not possible or only partially possible. Moreover, multiple transmissions may be useful to allow for further measurement opportunities for said at least one second radio network node 121-123, e.g. in order to average measurements of multiple transmissions of the uplink signal or to perform soft combining of multiple transmissions of the uplink signal. Furthermore, multiple transmissions may also be useful if a listening radio network node, i.e. one of said at least one second radio network node 121-123, has to apply analogue receive beamforming and can therefore only listen in one direction at a time. Such a radio network node then requires (at least) one uplink signal transmission for each receive beam direction it has to try, i.e. in which it has to listen for the uplink signal.

The contact information relating to the first radio network node 120 for establishment of communication interface may be an IP address, a Fully Qualified Domain Name (FQDN), an identifier from which a FQDN may be derived or the like. The FQDN may be translated to an IP address via a Domain Name Server (DNS). The contact information may be used by one or more of said at least one second radio network node 121-123 to send message(s) as in action 200 and/or to establish an inter-'radio network node' interface (inter-RAN interface), e.g. an eX2 interface. The contact information may further comprise, or be accompanied by, a cryptographic key or certificate, e.g. validating a public encryption key, to be used for securing any subsequent communication over the inter-RAN interface.

The information relating to at least one condition for transmission of the message may be instructions for the message, in action A200, e.g. specifying a channel quality threshold, as determined by measurement on the uplink signal transmission(s) from the user equipment 110, for when to send the message. This means that sending of the message may be omitted when the uplink signal is not received and decoded or when the uplink signal's quality does not exceed the channel quality threshold.

The information relating to format and/or contents of the message may indicate format for one or more various parameters of the message, e.g. number of bits/bytes for each of said one or more various parameter(s) and/or which of these various parameters to include or exclude from the message. Said one or more various parameter(s) may comprise a single bit indicating that the sender of the report is suitable as a neighbour to the first radio network node 120. Alternatively or additionally, said one or more various parameter may comprise one or more of the threshold relating to channel quality mentioned above, a threshold relating to one or more of path loss, signal strength, Signal-To-Noise-Ratio, Signal-To-Noise-and-Interference-Ratio, Signal-To-Interference-Ratio and the like.

The indication about a time window for transmission of the uplink signal may comprise one or more time slots, such as subframes, radio frames or the like.

And finally, the estimate about the user equipment's 110 position may relate to a location of the user equipment 110, which e.g. may be obtain by means of any known method based on e.g. Global Positioning System (GPS), Angle of Arrival (AOA), Time of Arrival (TOA)/Time, Difference of Arrival (TDOA), etc.

The first radio network node 120 may provide its existing neighbour relations, e.g. given by the ANR information, in the request message. The existing neighbour relations may be represented by the first set of radio network nodes 121. In this way, these existing neighbour relations can be excluded from a set of radio network nodes, e.g. said at least one second radio network node 121-123, to be evaluated with the automatic neighbour detection, or these existing neighbour relations may be re-evaluated.

Alternatively, the first radio network node 120 may omit information about its existing neighbour relations, or any part(s) of it, in order to use the automatic neighbour detection to repetitively verify that existing neighbour relations are still relevant. Thus, allowing the core network node 130 to find suitable radio network nodes to evaluate without any information about which radio network nodes currently are deemed to be neighbours to the first radio network node 120.

Moreover, it may be that the core network node 130 is already aware of the radio network node's 120 existing neighbour relations. This may happen when the core network node 130 has access to the ANR information, which may be located in a database accessible to the core network node 130. The core network node 130 may then choose to exclude the existing neighbour relations from the set of radio network nodes, e.g. said at least one second radio network node 121-123, to be evaluated. The core network node 130 may have acquired this knowledge by extracting information from preceding neighbour relation establishment signalling relayed by the core network node 130 or by receiving explicit information from radio network nodes, e.g. after each performed automatic neighbour detection.

In some examples, when the first radio network node 120 has performed action A030, it may mean that the first radio network node 120 is responsible for selecting the sequence for representing the UL signal. In these examples, the request message may comprise information about the selected sequence, e.g. an indication about the sequence or the like. In this manner, the first radio network node 120 may make it possible for the core network node 130, e.g. MME, to forward this information to said at least one second radio network node 121-123, i.e. any participating potential neighbour radio network nodes. The core network node 130 may, thus, take advantage of the information about the selected sequence when performing action A080, i.e. sending command(s) to at least some of said at least one second radio network node 121-123.

At this stage, the request has been sent to the core network node 130, which may perform e.g. one or more of actions A050, A060, A070, A080 and A120. After at least action A060, the core network node 130 may send a confirmation to the first radio network node 120.

Action A140

Accordingly, the first radio network node 120 may receive, from the core network node 130, the confirmation, such as a response, message, indication or the like, that at least one second radio network node 121-123 has been selected to listen for the uplink signal.

The confirmation may confirm that a command, as in action A080, has been sent, by the core network node 130, to said at least one second radio network node 121-123.

The command instructs said at least one second radio network node 121-123 to listen for at least one transmission of the uplink signal.

The confirmation may comprise an indication about said at least one resource in order to make the first radio network node 120 aware of which resource the core network node 130 may have selected for transmission of the uplink signal.

Action A150

The first radio network node 120 may obtain an indication (ind.) about at least one resource for transmission of the uplink signal.

Said at least one resource comprise at least one of a subframe, a subcarrier, a particular coding and the like. For example, the indication may indicate a so called Physical Resource Block, or a portion thereof, in case of LTE or an equivalent resource in case of another system than LTE.

As an example, the first radio network node 120 may obtain the indication in that the first radio network node 120 receives the indication from the core network node 130. As shall be seen below, this may happen when the core network node 130 determines said at least one resource according to one example of action A070. In this case, the confirmation may comprise said at least one resource as mentioned above.

As another example, the first radio network node 120 may obtain the indication in that the first radio network node 120 determines the indication. If the first radio network node 120 performs at least a first and a second automatic neighbour detection, e.g. with respect to at least a first and a second user equipments, the first radio network node 120 may ensure that at least one first resource for the first automatic neighbour detection is different from at least one second resource for the second automatic neighbour detection. In this manner, said at least one second radio network node 121-123 may be made aware of which of the first and second automatic neighbour detections a received uplink signal relates to.

Expressed differently, the first radio network node 120 may obtain the indication by that the first radio network node 120 may receive the indication about at least one resource from the core network node 130 and/or by that the first radio network node 120 may determine the indication about said at least one resource.

Action A160

In order to make the user equipment 110 aware of that the uplink signal is to be transmitted, the first radio network node 120 transmits, to the user equipment 110, an instruction to transmit the uplink signal, e.g. one or more uplink signals, USSs or the like.

The instruction may instruct the user equipment 110 to transmit the uplink signal, e.g. on at least one resource. This may mean that the instruction may comprise the indication about said at least one resource.

In some example, the instruction may be determined based on the confirmation. For example, when the confirmation comprises the indication about said at least one resource, the instruction may include the indication.

In view of the paragraphs directly above, the first radio network node 120 may ensure not to schedule any UL or DL transmissions for the assisting UE, which would be in conflict, e.g. coincide in time and/or frequency, with the upcoming transmission of the uplink signal.

When action A030 above is performed, the instruction may comprise the indication about the sequence.

At this stage both said at least one second radio network node 121-123 and the user equipment 110 are prepared, e.g. configured, for the automatic neighbour detection. Hence, when the user equipment 110 has sent the uplink signal and said at least one second radio network node 121-123 has received, and decoded, the uplink signal, said at least one second radio network node 121-123 may send a message, such as a report, to the first radio network node 120.

Action A220

Accordingly, the first radio network node 120 receives the message relating to whether said at least one second radio network node 121-123 is neighbouring to the first radio network node 120.

The message may comprise an indication indicating that the uplink signal was received by said at least one second radio network node 121-123. The indication may be a single bit indicating yes/no the uplink signal was received and possibly also fulfilled the condition provided by the request, a value of signal strength, signal quality etc.

The message may be received from said at least one second radio network node 121-123 and/or the core network node 130. This may mean that the message may be received from said at least one second radio network node 121-123 via the core network node.

Alternatively, this may mean that the message may be received directly from said at least one second radio network node 121-123 via a communication interface whose establishment may be initiated by the message, see action A200. Hence, the message may comprise an initiation of establishment of the communication interface between said first and said at least one second radio network nodes 120-123.

The message may comprise at least one of:

the indication—mentioned above—indicating that the uplink signal was received, an identifier of said at least one second radio network node 121-123, contact information relating to said at least one second radio network node 121-123 for establishment of communication interface, an encryption certificate for verification of identity of said at least one second radio network node 121-123 and/or for establishment of communication interface and/or for encryption/integrity protection of communication interface, a quality measure relating to the uplink signal received by said at least one second radio network node 121-123 information about a coverage area relating to said at least one second radio network node 121-123, information about a transmit power relating to said at least one second radio network node 121-123, information about a number of antenna sites relating to said at least one second radio network node 121-123, information about frequency bands supported by said at least one second radio network node 121-123, information about cells/sectors of said at least one second radio network node 121-123, and the like.

Each item of the list directly above, expect for the indication which already has been explained, will now be explained in more detail.

The identifier of said at least one second radio network node 121-123 may be an identifier of the radio network node to contact, e.g. a Cloud or Centralized RAN (C-RAN), a baseband unit (BBU), a controller unit or a fully self-contained (complete) radio network node and/or an identifier of a TRP, a Remote Radio Unit (RRU) an antenna site, a cell or a sector.

The contact information relating to said at least one second radio network node 121-123 for establishment of communication interface may comprise one or more of an IP address, a Fully Qualified Domain Name (FQDN), an identifier from which a FQDN may be derived or the like. The FQDN may be translated to an IP address via a Domain Name Server (DNS). The contact information may be used by the first radio network node 120 to establish the communication interface, such as an inter-'radio network node' interface (inter-RAN interface), e.g. an eX2 interface or the like. It may be noted that the contact information of the message differs from the contact information of the request in that the contact information of the message relates to said at least one second radio network node 121-123 and the contact information of the request relates to the first radio network node 120.

The encryption certificate for verification of identity of said at least one second radio network node 121-123 and/or for establishment of communication interface and/or for encryption/integrity protection of communication interface may comprise a certificate, e.g. validating a public encryption key, to be used for the protection of the communication interface. This means that the contact information may further comprise, or be accompanied by, the encryption certificate, such as a cryptographic key, which e.g. validates a public encryption key, to be used for securing any subsequent communication over the communication interface.

The quality measure relating to the uplink signal received by said at least one second radio network node 121-123 may comprise one or more of received power, SNR or the like.

The information about a coverage area relating to said at least one second radio network node 121-123 may be expressed as a set of geographical coordinates, a shape whose position is given by geographical coordinates or the like.

The information about a transmit power relating to said at least one second radio network node 121-123 may be expressed as a value in dB or the like.

The information about a number of antenna sites relating to said at least one second radio network node 121-123 may be expressed an integer or a range between to integers.

The information about frequency bands supported by said at least one second radio network node 121-123 may comprise one or more identities of the supported frequency bands, one or more frequency ranges expressed by respective start frequency and end frequency for the frequency range(s).

The information about cells/sectors of said at least one second radio network node 121-123 may indicate in which cell/sector of said at least one second radio network node 121-123 the uplink signal was received. The information may include any known identity for identification of the cell/sector.

Action A240

When the message indicates that said at least one second radio network node 121-123 is neighbouring to the first radio network node 120, the first radio network node may establish, or may initiate establishment of, a communication interface (com. interf.) between the first radio network node 120 and said at least one second radio network node 121-123. This may mean that the first radio network node 120 initiates the establishment of the communication interface towards all or a selected subset of said at least one second radio network node 121-123 that sent the message, or in more detail a respective message for each of said at least one second radio network node 121-123.

The message may comprise an initiation of establishment of a communication interface between said first and said at least one second radio network nodes 120-123.

When the first radio network node 120 initiates the establishment of the communication interface, the first radio network node 120 may utilize contact information of the message, which in this case is received via the core network node 130.

Alternatively, in the absence of such contact information of the message, the first radio network node 120 may request contact information from the core network node 130, which in turn may retrieve it from the concerned said at least one second radio network node 121-123 unless the core network node 130 already has possession of it. Moreover, the first radio network node 120 may ask the core network node 130 to relay or mediate signalling for establishment of the communication interface.

The actions performed by the first radio network node 120 have now been described. It is now turned to the actions performed by the user equipment 110.

Figure 5:
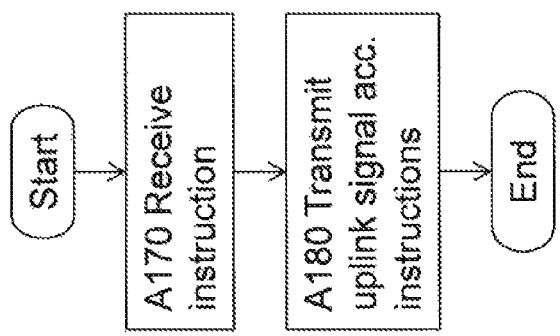
FIG. 5 is a flowchart illustrating embodiments of the method in the user equipment.

Hence, an exemplifying method performed by the user equipment 110 will now be described with reference to FIG. 2 and FIG. 5. The user equipment 110 performs a method for assisting a first radio network node 120 with automatic neighbour detection. The user equipment 110 may thus be referred to as "assisting user equipment".

One or more of the following actions may be performed in any suitable order.

Initially, the user equipment 110 may be present in a cell operated by the radio network node.

For various reasons, as described above, the automatic neighbour detection may be executing. At some point, the first radio network node 120 transmits an instruction to the user equipment 110.

Action A170

Subsequently to action A160 above, the user equipment 110 receives, from the first radio network node 120, the instruction about at least one resource for a transmission of an uplink signal. The instruction may comprise an indication about a sequence for representing the uplink signal.

See also action A160 above for details about the instruction.

Action A180

Following action A170, the user equipment 110 transmits, on at least said at least one resource, the uplink signal based on, e.g. according to (acc.), the instruction.

If a single common timeslot is agreed for all said at least one second radio network nodes 121-123, the user equipment 110 may transmit the uplink signal a single time. The agreement of the timeslot may be negotiated by the core network node 130 while communicating with said at least one second radio network node 121-123. See description in relation to FIG. 7.

Otherwise, the user equipment 110 may have to transmit the uplink signal multiple times to match any agreed multiple timeslots. Multiple timeslots and multiple transmissions of the uplink signal may also be used to provide further measurement opportunities for the listening at least one second radio network node 121-123, e.g. using averaging of measurements from multiple transmissions of the uplink signal.

For overlapping timeslots, the user equipment 110 may transmit the uplink signal in both timeslots by means of a single extended transmission of the uplink signal, i.e. adding extra repetitions of the sequence(s) used for representing the uplink signal. In other words, the user equipment 110 extends its transmission of the uplink signal beyond the nominal subframe/timeslot of one transmission of one uplink signal, e.g. by prepending or appending additional OFDM symbols carrying the same sequence. Alternatively, or in combination, the timeslot(s) during which said at least one second radio network node 121-123 listen for the uplink signal may be extended with additional OFDM symbol(s).

The actions performed by the user equipment 110 have now been described. It is now turned to the actions performed by the core network node 130.

Figure 7:
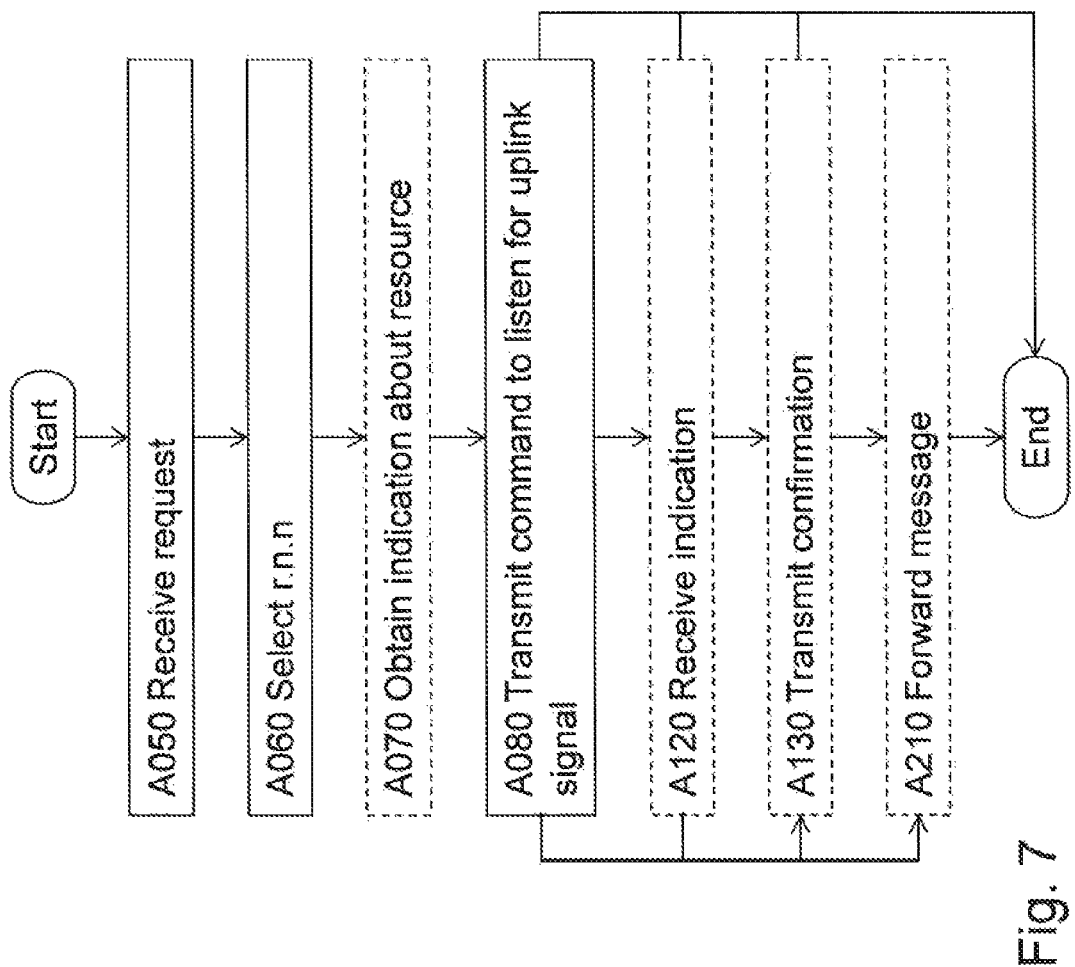
FIG. 7 is a flowchart illustrating embodiments of the method in the core network node.

Hence, an exemplifying method performed by the core network node 130 will now be described with reference to FIG. 2 and FIG. 7. The core network node 130 performs a method for enabling a first radio network node 120 to perform automatic neighbour detection.

One or more of the following actions may be performed in any suitable order.

At some point, it may have been determined that the automatic neighbour detection is to be performed. Therefore, the first radio network node 120 transmits a request to the core network node 130.

Action A050

Subsequently, the core network node 130 receives the request from the first radio network node 120 for initiation of automatic neighbour detection.

The request may comprise at least one of:

information relating to synchronization with respect to the first radio network node 120 and/or the user equipment 110, an indication about at least one resource for transmission of the uplink signal, Information relating to multiplicity of allocations for transmission of the uplink signal, contact information relating to the first radio network node 120 for establishment of communication interface, information relating to at least one condition for transmission of the message, information relating to format and/or contents of the message, an indication about a time window for transmission of the uplink signal, an estimate of the user equipment's 110 position, and the like.

See also action A040 above for details about the request.

After the request has been received, the core network node may, for example when the first radio network node 120 has not performed action A030, select a sequence for representing the uplink signal e.g. from a set of uplink synchronization sequences.

Similarly as for action A030, the sequence may be a dedicated uplink sequence, such as an Uplink Synchronization Sequence (USS). The sequence may be a single sequence which may be predetermined, pre-configured, statically or semi-statically configured or the like. Alternatively, the sequence may be one out of a set of sequences. The set of sequences may include one or more dedicated sequences, e.g. USS sequences, which may be set aside to be used only for automatic neighbour detection, or so called ANR session(s). Similarly to the single sequence, the dedicated sequences for the uplink signal may also be predetermined, pre-configured, statically or semi-statically configured.

If one or more dedicated uplink signals are used, it may be that the core network node 130 selects/allocates the uplink signal, since the core network node 130 has an overview and/or control of possible automatic neighbour detections, or ANR sessions, that may be going on in parallel in the vicinity of e.g. the first radio network node 120. Accordingly, the core network node 130 may select a sequence for representation of the uplink signal and/or at least one resource to use as described in action A070 below.

Thus, the core network node 130 may ensure that collisions between uplink signals related to different ANR sessions with respect to different initiating radio network nodes, whereof the first radio network node 120 is one example, are avoided.

Action A060

The core network node 130 selects at least one second radio network node (r.n.n.) 121-123, i.e. a suitable set of radio network nodes to participate in the ANR session aka the second set of radio network nodes 121-123, based at least in part on geographical information relating to said at least one second radio network node 121-123 in relation to geographical information related to the first radio network node 120.

To identify such a suitable set of radio network nodes, the core network node 130 uses geographical information, e.g. site positions or specifications of radio coverage areas, available for the radio network nodes connected to, i.e. managed by, the core network node 130, such as an MME. The geographical information has preferably been provided to the core network node 130 from said at least one second radio network node 121-123 when this/these radio network node(s) was/were deployed, e.g. when the interface/connection between any radio network node, to be managed by the core network node 130, and the core network node 130 was established. The core network node 130 may for instance use site location information from the first radio network node 120 as the origin, i.e. center, of a geographical area, e.g. a circle, around the first radio network node 120 and select all other radio network nodes located within that area to be part of the second set, i.e. said at least one second radio network node 121-123 that take part in the automatic neighbour detection.

The core network node 130 may also base the selection on information about radio coverage areas of each radio network nodes that the core network node 130 handles, and/or may also include transmit power information, e.g. received from each radio network node, e.g. when the interface between the radio network node and the core network was established, when assessing which radio network nodes that are suitable to include in the second set of radio network node 121-123.

Furthermore, to enable the core network node 130 to further refine its selection of radio network nodes to participate in the ANR session, the first radio network node 120 may include an estimate of the assisting UE's location, i.e. the user equipment's 110 position, in the request message based on some available positioning means, e.g. based on direction of transmission, towards the user equipment 110, and/or direction of arrival of transmissions from the user equipment 110, combined with current timing advance of the assisting user equipment 110.

The core network node 130 may not only use the estimate of the user equipment's 110 position to refine its selection of radio network nodes to participate in the ANR session, but may also, or instead, forward the estimate to the selected radio network nodes. A selected radio network node, such as said at least one second radio network node 121-123, receiving the estimate may use it to optimize its monitoring of the scheduled uplink transmission, e.g. by using uneven directivity for the reception of uplink transmissions favouring directions close to a line of sight direction from a location of the selected radio network node to the position of the user equipment 110 as given by the estimate. For instance, the selected radio network node may listen only, or with higher sensitivity, in directions matching a sector angle, wherein the middle of the sector is directed straight towards the position of the user equipment 110, which again is given by the estimate.

As mentioned, the core network node 130 may include the O&M system, which may aid in identifying radio network nodes in the vicinity of the first radio network node 120. The core network node 130 may request this information from the O&M system, but the O&M system may also have configured the core network node 130 with the information beforehand.

In one example, the O&M system entirely takes over the role of the core network node 130 for the performance of the automatic neighbour detection. In this case, the first radio network node 120 may instead contact the O&M system to request selection of listening radio network nodes and resource allocations for the uplink signal and the listening radio network nodes may also report the result to the O&M system, which in turn may inform the first radio network node 120.

Action A070

The core network node 130 may obtain an indication about at least one resource for transmission of the uplink signal.

In a first example, the core network node 130 may obtain the indication in that the core network node 130 may determine the indication about at least one resource. This is useful when the request does not comprise the indication about the resource or when the request comprises many resources from among which the core network node 130 may select, or negotiate with said at least one second radio network node 121-123, a particular one to use. When determining the indication about at least one resource, the core network node 130 may take into account possible information about possible usage of analogue receive beamforming and number of receive beam directions that needs to be tried in any of said at least one second radio network nodes 121-123 (which information the core network node 130 may have received e.g. in conjunction with initial interface establishment towards said at least one second radio network node 121-123 in conjunction with deployment of said at least one second radio network node 121-123).

In a second example, the core network node 130 may obtain the indication in that the core network node 130 may receive the indication about at least one resource from the first radio network node 120. The indication may then be comprised in the request received in action A050.

With the first and second examples, the command may comprise the indication.

In a third example, the core network node 130 may obtain the indication in that the core network node 130 may receive the indication about at least one resource from said at least one second radio network node, e.g. as part of negotiating with said at least one second radio network node 121-123. Also in this third example the core network node 130 may take into account possible information about possible usage of analogue receive beamforming and number of receive beam directions that needs to be tried in any of the at least one second radio network nodes 121-123. In this case the core network node 130 may obtain this information in conjunction with the negotiation.

Action A080

The core network node 130 transmits, to said at least one second radio network node 121-123, a command instructing said at least one second radio network node 121-123 to listen for the uplink signal.

The command may indicate at least one resource for monitoring by said at least one second radio network node 121-123 to receive at least one transmission of the uplink signal.

Alternatively or additionally, the command may comprise an indication about the sequence for representing the uplink signal and/or an indication about a time window for transmission of the uplink signal.

In this manner, the core network node 130 commands at least one second radio network node 121-123 to listen for the uplink signal to be transmitted from the user equipment 110.

Any items of the request, received in action A050, may be forwarded to each of said at least one second radio network node 121-123.

Hence, the command may comprise at least one of:

the information relating to synchronization with respect to the first radio network node 120 and/or the user equipment 110, the indication about said at least one resource for transmission of the uplink signal, the information relating to multiplicity of allocations for transmission of the uplink signal, the contact information relating to the first radio network node 120 for establishment of communication interface, the information relating to at least one condition for transmission of the message, the information relating to format and/or contents of the message, the indication about a time window for transmission of the uplink signal, the estimate of the user equipment's 110 position, and the like.

See explanations of each item in relation to the description of the request above in action A040.

As an example this action may be that the core network node 130 contacts, i.e. sends the command, said at least one second radio network node 121-123 for allocation of resources to be used for the uplink signal. In conjunction with this, the core network node 130 also informs said at least one second radio network node 121-123 about the sequence of the uplink signal, which the assisting user equipment 110 will transmit during the automatic neighbour detection. Furthermore, the core network node 130 may forward the contact information and information relating to format and/or contents and/or conditions for transmission of the message to said at least one second radio network node 121-123.

Depending on whether the command allows for negotiation or not, two cases occur. In a first case, action A120 is performed and in a second case, action A120 is not performed. In the first case, it may be that at least one of said at least one second radio network node 121-123 may have transmitted an indication about at least one resource at which it would be possible for that particular second radio network node 121-123 to receive and decode the uplink signal. In some examples, said at least one resource may comprise a time window, a period of time, an interval of time or the like. In some cases, the indication may comprise frequency window, a frequency interval, a frequency range or the like.

Action A120

Therefore, the core network node 130 may receive, from at least one of said at least one second radio network node 121-123, an indication about said at least one resource for transmission of the uplink signal. In more detail, the core network node 130 may receive a respective indication from one or more of said at least one second radio network node 121-123. This may mean that the core network node 130 may receive a set of indications comprising the respective indication for each of said at least one second radio network node 121-123 that transmitted the respective indication.

In case the respective indication(s) comprises a window, be it the time window and/or the frequency window, the core network node 130 may attempt to find, based on the set of indications, a small number of slots, or even the minimum number of slots, in which the uplink signal has to be transmitted in order to match at least one slot of every said at least one second radio network node 121-123 that participates in the automatic neighbour detection. The term slot may here thus refer to a timeslot, such as a subframe or the like, and/or a frequency slot, such as subcarrier or the like.

In summary, as an example relating to when the indication comprises a time window, it may be that the core network node 130 has received three indications from three different radio network nodes. These three different radio network nodes are taken as examples of said at least one second radio network node 121-123. The core network node 130 may then attempt to find as few, or almost as few, timeslots for the uplink signal to be transmitted in while at the same time each of the three different radio network nodes are able to receive the uplink signal. As a special case, it may be that the three different indications indicate one and the same time window, in which case it is a simple task to pick a timeslot within said one and the same time window. Sometimes, it may be that three time window indicated by the three indications are only partially overlapping but it may still be possible to find a common timeslot. When none of the three time windows are overlapping, the core network node 130 may have to choose three different timeslot, one for each of said three different radio network nodes.

In view of the above, the core network node 130 may allocate a timeslot for the uplink signal in response to the request from the first radio network node 120.

Action A130

The core network node 130 may transmit, to the first radio network node 120, a confirmation that at least one second radio network node 121-123 has been selected to listen for the uplink signal.

See details about the confirmation above, e.g. in relation to action A140, A150 and the like.

Concerning allocation of the timeslot and/or frequency slot as in action A120, the core network node 130 may then transmit the result of the allocation in the confirmation that is transmitted response to the request from the first radio network node 120.

When the allocation is concluded, the core network node 130 responds to the request from the first radio network node 120 with the confirmation, wherein the confirmation includes information about the resource(s) to be used for transmission of the uplink signal.

If the core network node 130 selected the sequence to be used for representing the uplink signal, the core network node 130 includes an indication of the sequence in the confirmation.

The core network node 130 may also include synchronization inaccuracy information, e.g. to allow the first radio network node 120 to instruct the assisting user equipment 110 to use an appropriate length of transmission of the uplink signal. This information thus relates to multiplicity of transmission of the uplink signal. Accordingly, this is further case in which the information about multiplicity of transmission of the uplink signal may be useful.

When resources for transmission of the uplink signal have been allocated, the core network node 130 informs the first radio network node 120, by use of the confirmation, about the allocated resources, such as timeslot(s) and/or frequency range(s).

Moreover, the core network node 130 may also inform said at least one second radio network node 121-123 of the allocated timeslots, e.g. at least those one or more radio network nodes that indicated a time window spanning multiple timeslots.

Action A210

In some example, the core network node 130 may forward the message from none or at least one of said at least one second radio network node 121-123. This happens for example when the message does not indicate an initiation of establishment of the communication interface.

As an example, it may also be that the core network node 130 receives the message from at least one of said at least one second radio network node 121-123. The core network node 130 may then re-generate the message, or generate a new message, while including some additional information in the message. Said some additional information may comprise one or more of the items listed as being possible to include in the message if that one or more item is not already included in the message when the core network node 130 receives the message.

It shall though be understood that the core network node 130 may sometimes forward the message while not even being aware of its existence. That is to say, the message may be transparent to the core network node 130.

The actions performed by the core network node 130 have now been described. It is now turned to the actions performed by the second radio network node 121-123, which is an example of at least one second radio network node 121-123.

Figure 9:
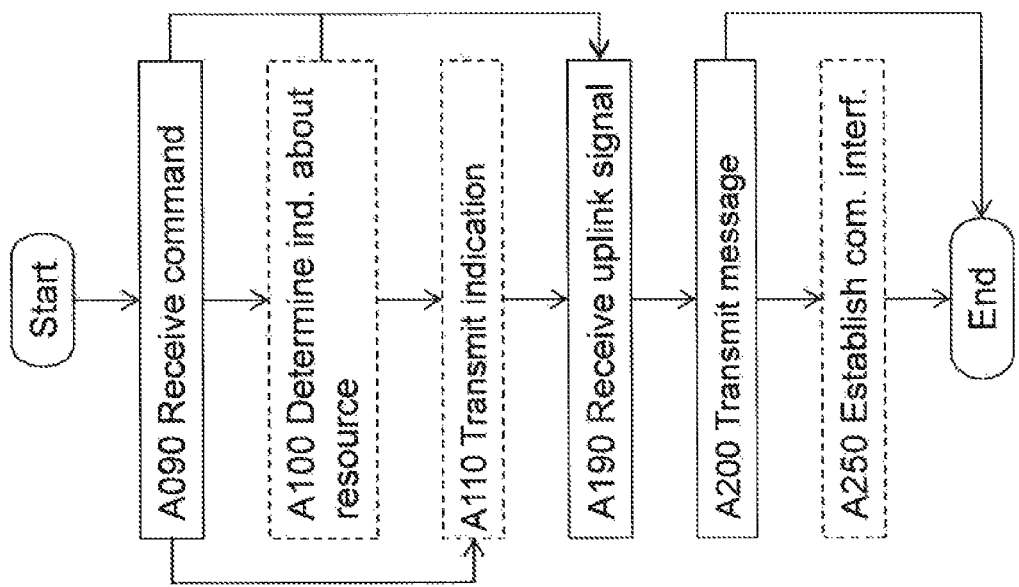
FIG. 9 is a flowchart illustrating embodiments of the method in the second radio network node.

Hence, an exemplifying method performed by the second radio network node 121-123, i.e. one of said at least one second radio network node 121-123, will now be described with reference to FIG. 2 and FIG. 9. The second radio network node 121-123 performs a method for enabling automatic neighbour detection performed by a first radio network node 120.

One or more of the following actions may be performed in any suitable order.

As described above in action A080, the core network node 130 may transmit the command.

Action A090

Therefore, subsequently to action A080, the second radio network node 121-123 receives, from the core network node 130, the command instructing the second radio network node 121-123 to listen for an uplink signal to be transmitted by the user equipment served by the first radio network node 120.

In this manner, the core network node 130 may propose to said at least one second radio network node 121-123 one or more timeslots, e.g. a time window, when they should listen for the uplink signal. This means that the command may include said at least one resource, such as said one or more timeslots. The timeslot(s)/the time window may have been provided by the first radio network node 120 in the request or it/they may be selected, or determined, by the core network node 130.

The command may comprise at least one of:

the information relating to synchronization with respect to the first radio network node 120 and/or the user equipment 110, the indication about said at least one resource for transmission of the uplink signal, the information relating to multiplicity of allocations for transmission of the uplink signal, the contact information relating to the first radio network node 120 for establishment of communication interface, the information relating to at least one condition for transmission of the message, the information relating to format and/or contents of the message, the indication about a time window for transmission of the uplink signal, the estimate of the user equipment's 110 position, and the like.

See also action A080 above for details about the command.

In a particular example, when the command comprises the estimate of the user equipment's 110 position, the second radio network node 121-123 may adapt its listening for the uplink signal based on the estimate, e.g. by listening for the uplink signal in a directive manner in a direction towards the position of the user equipment 110 as given by the estimate. The direction originates from a location of the second radio network node 121-123, which may be obtain by it according to known manners. See also description of action A060 relating to the estimate.

Action A100

The second radio network node 121-123 may accept the timeslot or time window or the second radio network node 121-123 may select and respond with a timeslot as close after, or possibly overlapping with, the timeslot/time window of the command as possible. In case, one or more of said at least one second radio network node 121-123 responds with the timeslot, or a time window, please see action A110 below which is related to action A120 above. When doing this, the second radio network node 121-123 may take into account whether it has to apply analogue receive beamforming and will only be able to listen in one direction at a time, when listening for and trying to receive the uplink signal. In such a case, the second radio network node 121-123 may also determine how many receive beam directions it has to try.

In this manner, the second radio network node 121-123 may determine, based on the indication of the time window, an indication about at least one resource for transmission of the uplink signal.

Action A110

In case the core network node 130 provides the time window, it may be that the second radio network node 121-123 may respond with one or a subset (possibly equal to the full set) of timeslots out of the set, in which the second radio network node 121-123 accepts to listen for the uplink signal. The time window may be used by the core network node 130 as explained above in relation to action A120.

This may mean that the second radio network node 121-123 may transmit, to the core network node 130, an indication about at least one resource for transmission of the uplink signal. When doing this, the second radio network node 121-123 may take into account whether it has to apply analogue receive beamforming and will only be able to listen in one direction at a time when listening for and trying to receive the uplink signal. In such a case, the second radio network node 121-123 may also determine how many receive beam directions it has to try.

While the actions of the second radio network node 121-123 above may aid the core network node 130 if the core network node 130 is responsible for allocation of said at least one resource for transmission of the uplink signal, there are cases in which the command indicates said at least one resource, i.e. without any possibility for negotiation.

Action A190

At this stage, the second radio network node 121-123 is aware of on which resources, i.e. on said at least one resource, to listen for the uplink signal. Thus, the second radio network node 121-123 receives, and decodes, the uplink signal from the user equipment 110.

In some cases, it may turn out that the second radio network node 121-123 is not suitable as a neighbour to the first radio network node 120 since the uplink signal is not received and decoded by the second radio network node 121-123.

Action A200

When the uplink signal has been received, the second radio network node 121-123 transmits, the message relating to whether the second radio network node 121-123 is neighbouring to the first radio network node 120. This may mean that the message is determined based on, or according to, the uplink signal.

See also action 220 for details about the message.

The message may comprise an indication indicating that the uplink signal was received by the second radio network node 121-123.

The message may comprise at least one of:

an identifier of said at least one second radio network node 121-123, contact information relating to said at least one second radio network node 121-123 for establishment of communication interface, an encryption certificate for verification of identity of said at least one second radio network node 121-123 and/or for establishment of communication interface and/or for encryption/integrity protection of communication interface, a quality measure relating to the uplink signal received by said at least one second radio network node 121-123 information about a coverage area relating to said at least one second radio network node 121-123, information about a transmit power relating to said at least one second radio network node 121-123, information about a number of antenna sites relating to said at least one second radio network node 121-123, information about frequency bands supported by said at least one second radio network node 121-123, and the like.

As an example, after a duration given by said at least one resource, e.g. a time period during which the second radio network node 121-123 listens for the uplink signal, the second radio network node 121-123 reports a result of listening for the uplink signal to the core network node 130, which forwards the result to the first radio network node 120. The result may thus be comprised in the message.

Alternatively, the second radio network node 121-123 may report directly to the first radio network node 120, using previously received contact information i.e. received from the core network node 130, relaying it from the first radio network node 120.

When the second radio network node 121-123 did not detect the uplink signal, or did not receive it with sufficiently good quality, may indicate this explicitly in the message or implicitly by omitting transmission of the message.

Action 250

When the message indicates that the second radio network node 121-123 is neighbouring to the first radio network node 120, the second radio network node 121-123 may establish the communication interface between the first radio network node 120 and the second radio network node 121-123.

In this case, the message may comprise an initiation of establishment of a communication interface between the first and second radio network nodes 120-123.

Considerations Concerning Synchronization between Radio Network Nodes and between the Radio Network Node and the Core Network Node The synchronization between the involved radio network nodes may vary. This is especially the case, because there is no inter-RAN node (e.g. eX2) interface yet, over which synchronization can be achieved. Hence, the inter-RAN node synchronization can be quite poor, unless some common synchronization source, e.g. network based or GPS (or other GNSS), is used, which is independent of that the communication interface, such as the inter-RAN node, eX2 interface, is established.

Unless there is an independent mutual time reference in place, e.g. GPS based, the core network node 130 has to provide a time reference when communicating with said at least one second radio network node 121-123, e.g. when transmitting the command in action A080. In particular, the time reference may be needed for the allocation of said at least one resource, such as the timeslot(s) for transmission of the uplink signal.

Hence, when the core network node 130 negotiates said at least one resource to be used, such as the timeslot(s), with said at least one second radio network node 121-123, as well as when informing the first radio network node 120, e.g. by means of the confirmation and when informing, i.e. not negotiating with, said at least one second radio network node 121-123, e.g. by means of the command, the core network node's 130 timing may be used as the time reference, i.e. a common reference.

The time reference may be established by the reception of the request from the first radio network node 120, which potentially is subject to variable delays e.g. due to Stream Control Transmission Protocol (SCTP) retransmissions. The core network node 130 may try to estimate the synchronization of the first radio network node 120, e.g. based on the time of reception of the request message and previous Round-Trip-Time (RTT) measurements, and use this as the time reference in order to get as close as possible to synchronization the user equipment 110 will be using when transmitting the uplink signal.

The request, e.g. in action A040, may even contain a time indication, e.g. the time of sending the request according to the first radio network node's 120 synchronization, in order to facilitate for the core network node 130 to estimate the synchronization of the first radio network node 120. To even further improve the accuracy of the core network node's 130 synchronization estimate, the first radio network node 120 may further include in the request an estimation of the difference between the first radio network node's 120 synchronization and the user equipment's 110 synchronization, e.g. based on the user equipment's 110 current timing advance. Possibly, the core network node 130 may also consider the RTT time of a request-confirmation exchange relating to one of said at least one second radio network nodes 121-123, when contacting another one of said at least one second radio network nodes 121-123 or when contacting the first radio network node 120.

As an alternative to these synchronization estimations, the core network node 130 may be configured with a measure of synchronization differences between radio network nodes and between the radio network node and the core network node. The measure may be expressed in terms of an average difference, a maximum difference or a 95-percentile, or other percentile, difference. The variation or standard deviation of the synchronization differences may also be configured, e.g. in combination with an average value.

Using the above described methods to estimate the synchronization of the radio network node 120-123, the core network node 130 may estimate, or be configured with, inaccuracy in the timeslot definitions, e.g. due to inaccurate synchronization, and inform the first radio network node 120 or this may be preconfigured in the radio network nodes.

Once having a reasonable estimate of the synchronization inaccuracy, and possibly the synchronization difference between the user equipment 110 and the first radio network node 120, the synchronization inaccuracy between radio network nodes and inaccuracy in the timeslot definition may be accounted for through one of the following:

- the user equipment 110 extends the transmission of the uplink signal, e.g. by adding repetitions of the sequence(s) used for representing the uplink signal,
- the timeslot(s) during which said at least one second radio network node 121-123 listen for the uplink signal is/are extended e.g. with additional OFDM symbol(s), i.e. OFDM symbol time length(s),
- both of the above, whereby the user equipment 110 and said at least one second radio network node 121-123 share effort to compensate for the synchronization inaccuracy, and the like.

It may further be noted that a 5G system, such as a 5G Radio Access Network (RAN), may have a more distributed architecture than a traditional LTE radio access network, e.g. with control and transmission responsibilities in separate entities e.g. a RAN controller node, e.g. a C-RAN, and remote radio units (RRUs) at distributed antenna sites The RAN architecture may also consist of more entities/nodes, such as a Radio Controller Unit, a Baseband Unit, and a Packet Processing Unit. During detection of suitable neighbours and establishment of neighbour relations and inter-RAN node interfaces, the first radio network node 120 initiating the automatic neighbour detection may be interested in both an indication of the entity associated with the uplink signal reception, which will handle the reception/transmission of the signals used in subsequent potential handovers, and an indication of the second radio network node 121-123 to which the communication interface is to be established for communication such as handover control signalling or Inter-Cell-Interference-Coordination (ICIC) signalling. As mentioned before, said at least one second radio network node 121-123 may be a controller node, a C-RAN, a baseband unit (BBU) or a fully self-contained (complete) radio network node or the like.

Figure 4:
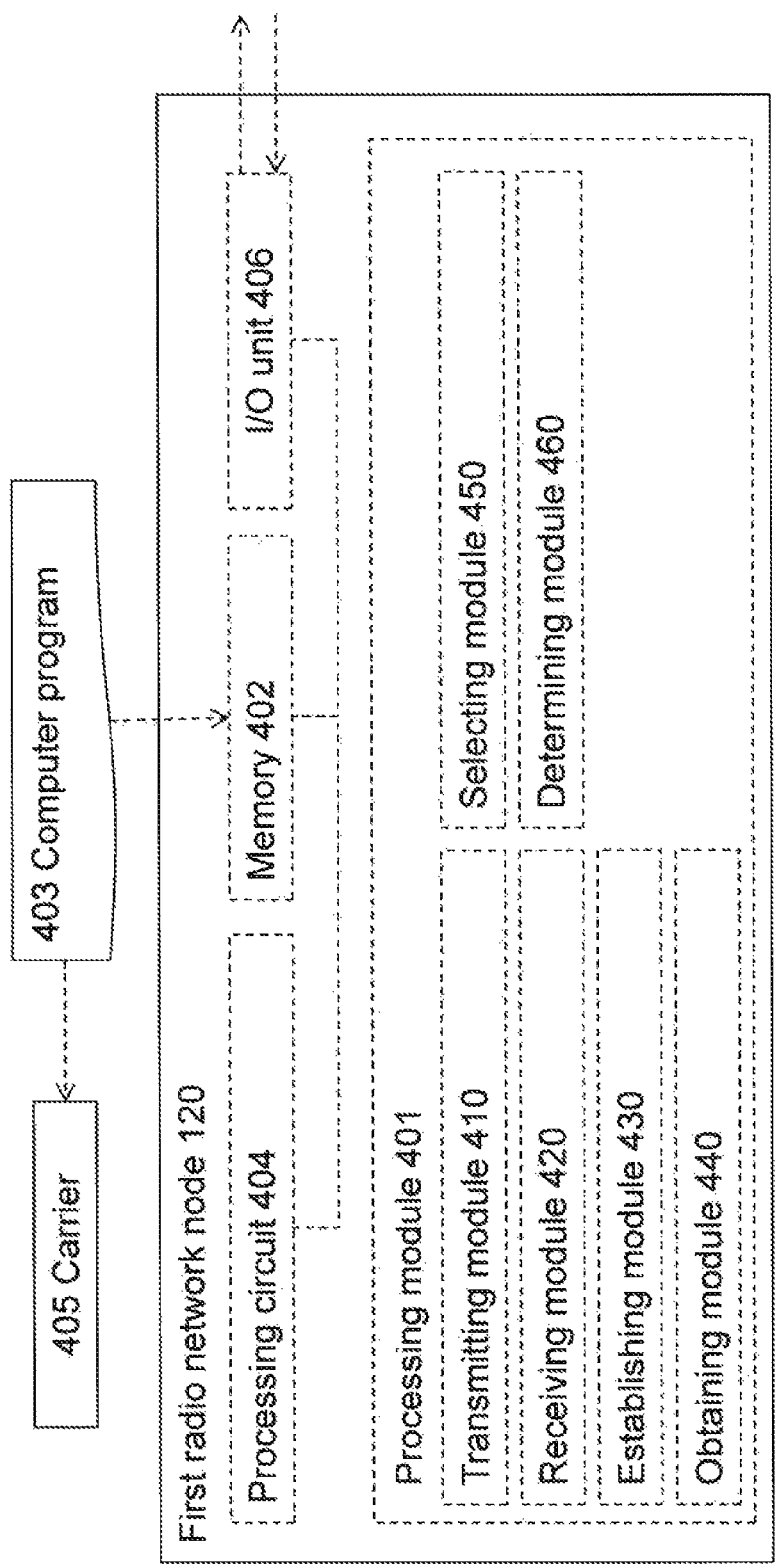
FIG. 4 is a block diagram illustrating embodiments of the first radio network node.

With reference to FIG. 4, a schematic block diagram of embodiments of the first radio network node 120 of FIG. 1 is shown.

The first radio network node 120 may comprise a processing module 401, such as a means for performing the methods described herein. The means may be embodied in the form of one or more hardware modules and/or one or more software modules The first radio network node 120 may further comprise a memory 402. The memory may comprise, such as contain or store, instructions, e.g. in the form of a computer program 403, which may comprise computer readable code units.

According to some embodiments herein, the first radio network node 120 and/or the processing module 401 comprises a processing circuit 404 as an exemplifying hardware module, which may comprise one or more processors. Accordingly, the processing module 401 may be embodied in the form of, or 'realized by', the processing circuit 404. The instructions may be executable by the processing circuit 404, whereby the first radio network node 120 is operative to perform the methods of FIG. 2 and/or FIG. 3. As another example, the instructions, when executed by the first radio network node 120 and/or the processing circuit 404, may cause the first radio network node 120 to perform the method according to FIG. 2 and/or FIG. 3.

In view of the above, in one example, there is provided a first radio network node 120 for automatic neighbour detection. Again, the memory 402 contains the instructions executable by said processing circuit 404 whereby the first radio network node 120 is operative for:

transmitting a request to a core network node 130 for initiation of the automatic neighbour detection, transmitting, to a user equipment 110, an instruction to transmit an uplink signal, and receiving a message relating to whether at least one second radio network node 121-123 is neighbouring to the first radio network node 120.

FIG. 4 further illustrates a carrier 405, or program carrier, which comprises the computer program 403 as described directly above.

In some embodiments, the first radio network node 120 and/or the processing module 401 may comprise one or more of a transmitting module 410, a receiving module 420, an establishing module 430, an obtaining module 440, a selecting module 450, and a determining module 460 as exemplifying hardware modules. In other examples, one or more of the aforementioned exemplifying hardware modules may be implemented as one or more software modules.

Moreover, the processing module 401 comprises an Input/Output unit 406, which may be exemplified by the receiving module and/or the transmitting module when applicable.

Accordingly, the first radio network node 120 is configured for automatic neighbour detection.

Therefore, according to the various embodiments described above, the first radio network node 120 and/or the processing module 401 and/or the transmitting module 410 is configured for transmitting a request to a core network node 130 for initiation of the automatic neighbour detection.

The first radio network node 120 and/or the processing module 401 and/or the transmitting module 410 is configured for transmitting, to a user equipment 110, an instruction to transmit an uplink signal.

The first radio network node 120 and/or the processing module 401 and/or the receiving module 420 is configured for receiving a message relating to whether at least one second radio network node 121-123 is neighbouring to the first radio network node 120.

As mentioned, the message may comprise an indication indicating that the uplink signal was received by said at least one second radio network node 121-123.

The first radio network node 120 and/or the processing module 401 and/or the receiving module 420 may be configured for receiving, from the core network node 130, a confirmation that at least one second radio network node 121-123 has been selected to listen for the uplink signal.

As mentioned, the request may comprise an indication of zero or more of said at least one second radio network node 121-123. The message may be received from said at least one second radio network node 121-123 and/or the core network node 130.

Furthermore, the first radio network node 120 and/or the processing module 401 and/or the establishing module 430 may be configured for establishing a communication interface between the first radio network node 120 and said at least one second radio network node 121-123, when the message indicates that said at least one second radio network node 121-123 is neighbouring to the first radio network node 120.

As mentioned, the message may comprise an initiation of establishment of a communication interface between said first and said at least one second radio network nodes 120-123. The message may comprise at least one of:

an identifier of said at least one second radio network node 121-123, contact information relating to said at least one second radio network node 121-123 for establishment of communication interface, an encryption certificate for verification of identity of said at least one second radio network node 121-123 and/or for establishment of communication interface and/or for encryption/integrity protection of communication interface, a quality measure relating to the uplink signal received by said at least one second radio network node 121-123 information about a coverage area relating to said at least one second radio network node 121-123, information about a transmit power relating to said at least one second radio network node 121-123, information about a number of antenna sites relating to said at least one second radio network node 121-123, information about frequency bands supported by said at least one second radio network node 121-123, and the like.

The first radio network node 120 and/or the processing module 401 and/or the obtaining module 440 may be configured for obtaining an indication about at least one resource for transmission of the uplink signal. The first radio network node 120 and/or the processing module 401 and/or the obtaining module 440 may be configured for obtaining the indication by that the first radio network node 120 and/or the processing module 401 and/or the obtaining module 440 may be configured for receiving the indication about at least one resource from the core network node 130.

The first radio network node 120 and/or the processing module 401 and/or the selecting module 450 may be configured for selecting a sequence for representing the uplink signal from a set of uplink synchronization sequences. The request may comprise an indication about the sequence. The instruction may comprise the indication about the sequence. As mentioned, the request may comprise at least one of:

information relating to synchronization with respect to the first radio network node 120 and/or the user equipment 110, an indication about at least one resource for transmission of the uplink signal, information relating to multiplicity of allocations for transmission of the uplink signal, contact information relating to the first radio network node 120 for establishment of communication interface, information relating to at least one condition for transmission of the message, information relating to format and/or contents of the message, an indication about a time window for transmission of the uplink signal, an estimate of the user equipment's 110 position, and the like.

The instruction may instruct the user equipment 110 to transmit the uplink signal on at least one resource.

The first radio network node 120 and/or the processing module 401 and/or the selecting module 440 may be configured for selecting the user equipment 110 from a group of user equipments located at an edge of a cell, the cell being operated by the first radio network node 120.

The first radio network node 120 and/or the processing module 401 and/or the determining module 460 may be configured for determining to perform the automatic neighbour detection.

Figure 6:
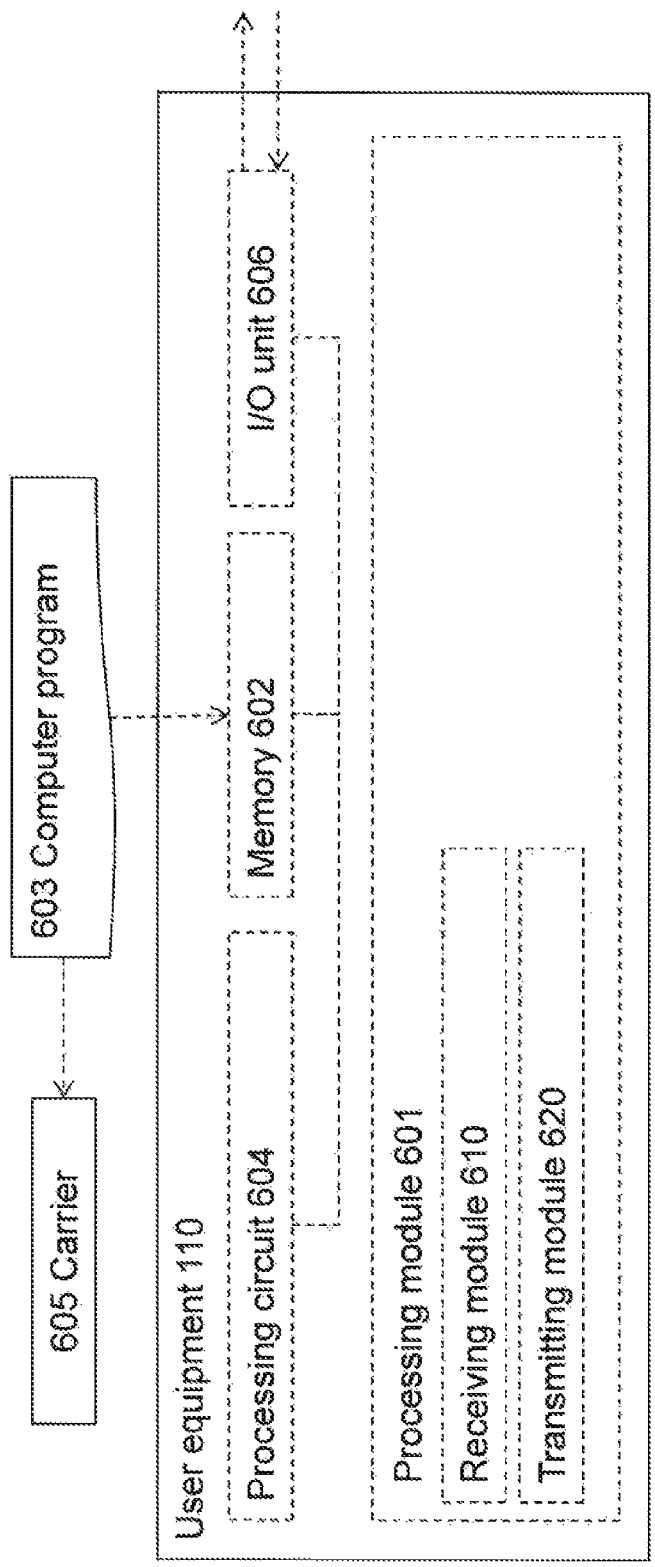
FIG. 6 is a block diagram illustrating embodiments of the user equipment.

With reference to FIG. 6, a schematic block diagram of embodiments of the user equipment 110 of FIG. 1 is shown.

The user equipment 110 may comprise a processing module 601, such as a means for performing the methods described herein. The means may be embodied in the form of one or more hardware modules and/or one or more software modules The user equipment 110 may further comprise a memory 602. The memory may comprise, such as contain or store, instructions, e.g. in the form of a computer program 603, which may comprise computer readable code units.

According to some embodiments herein, the user equipment 110 and/or the processing module 601 comprises a processing circuit 604, which may comprise one or more processors, as an exemplifying hardware module. Accordingly, the processing module 601 may be embodied in the form of, or 'realized by', the processing circuit 604. The instructions may be executable by the processing circuit 604, whereby the user equipment 110 is operative to perform the methods of FIG. 2 and/or FIG. 5. As another example, the instructions, when executed by the user equipment 110 and/or the processing circuit 604, may cause the user equipment 110 to perform the method according to FIG. 2 and/or FIG. 5.

In view of the above, in one example, there is provided a user equipment 110 for assisting a first radio network node 120 with automatic neighbour detection. Again, the memory 602 contains the instructions executable by said processing circuit 604 whereby the user equipment 110 is operative for:

receiving, from the first radio network node 120, an instruction about at least one resource for a transmission of an uplink signal, and transmitting, on at least said at least one resource, the uplink signal based on the instructions.

FIG. 6 further illustrates a carrier 605, or program carrier, which comprises the computer program 603 as described directly above.

In some embodiments, the processing module 601 comprises an Input/Output unit 606, which may be exemplified by a receiving module and/or a transmitting module when applicable.

In further embodiments, the user equipment 110 and/or the processing module 601 may comprise one or more of a receiving module 610, and a module transmitting 620 as exemplifying hardware modules. In other examples, one or more of the aforementioned exemplifying hardware modules may be implemented as one or more software modules.

Accordingly, the user equipment 110 is configured for assisting a first radio network node 120 with automatic neighbour detection.

Therefore, according to the various embodiments described above, the user equipment 110 and/or the processing module 601 and/or the receiving module 610 is configured for receiving, from the first radio network node 120, an instruction about at least one resource for a transmission of an uplink signal.

The user equipment 110 and/or the processing module 601 and/or the transmitting module 620 is configured for transmitting, on at least said at least one resource, the uplink signal based on the instructions.

As mentioned, the instruction may comprise an indication about a sequence for representing the uplink signal.

Figure 8:
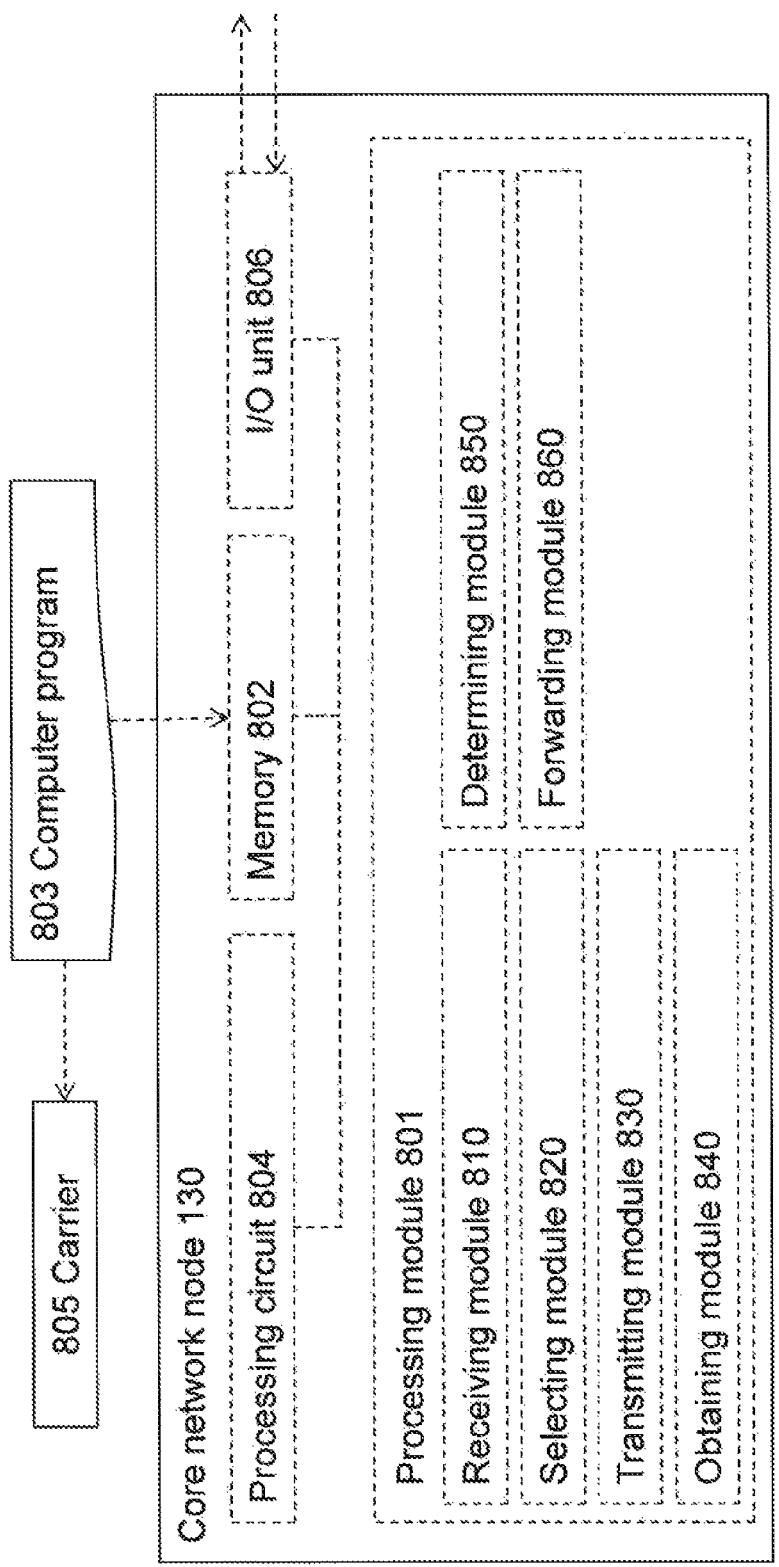
FIG. 8 is a block diagram illustrating embodiments of the core network node.

With reference to FIG. 8, a schematic block diagram of embodiments of the core network node 130 of FIG. 1 is shown.

The core network node 130 may comprise a processing module 801, such as a means for performing the methods described herein. The means may be embodied in the form of one or more hardware modules and/or one or more software modules The core network node 130 may further comprise a memory 802. The memory may comprise, such as contain or store, instructions, e.g. in the form of a computer program 803, which may comprise computer readable code units.

According to some embodiments herein, the core network node 130 and/or the processing module 801 comprises a processing circuit 804, which may comprise one or more processors, as an exemplifying hardware module. Accordingly, the processing module 801 may be embodied in the form of, or 'realized by', the processing circuit 804. The instructions may be executable by the processing circuit 804, whereby the core network node 130 is operative to perform the methods of FIG. 2 and/or FIG. 7. As another example, the instructions, when executed by the core network node 130 and/or the processing circuit 804, may cause the core network node 130 to perform the method according to FIG. 2 and/or FIG. 7.

In view of the above, in one example, there is provided a core network node 130 for enabling a first radio network node 120 to perform automatic neighbour detection. Again, the memory 802 contains the instructions executable by said processing circuit 804 whereby the core network node 130 is operative for:

receiving a request from the first radio network node 120 for initiation of automatic neighbour detection, selecting at least one second radio network node 121-123 based at least in part on geographical information relating to said at least one second radio network node 121-123 in relation to geographical information related to the first radio network node 120, and transmitting, to said at least one second radio network node 121-123, a command instructing said at least one second radio network node 121-123 to listen for the uplink signal.

FIG. 8 further illustrates a carrier 805, or program carrier, which comprises the computer program 803 as described directly above.

In some embodiments, the processing module 801 comprises an Input/Output unit 806, which may be exemplified by a receiving module and/or a transmitting module when applicable.

In further embodiments, the core network node 130 and/or the processing module 801 may comprise one or more of a receiving module 810, a selecting module 820, a transmitting module 830, an obtaining module 840, a determining module 850, and a forwarding module 860 as exemplifying hardware modules. In other examples, one or more of the aforementioned exemplifying hardware modules may be implemented as one or more software modules.

Accordingly, the core network node 130 is configured for enabling a first radio network node 120 to perform automatic neighbour detection.

Therefore, according to the various embodiments described above, the core network node 130 and/or the processing module 801 and/or the receiving module 810 is configured for receiving a request from the first radio network node 120 for initiation of automatic neighbour detection.

The core network node 130 and/or the processing module 801 and/or the selecting module 810 is configured for selecting at least one second radio network node 121-123 based at least in part on geographical information relating to said at least one second radio network node 121-123 in relation to geographical information related to the first radio network node 120.

The core network node 130 and/or the processing module 801 and/or transmitting module 830 is configured for transmitting, to said at least one second radio network node 121-123, a command instructing said at least one second radio network node 121-123 to listen for the uplink signal.

The core network node 130 and/or the processing module 801 and/or the obtaining module 840 may be configured for obtaining an indication about at least one resource for transmission of the uplink signal.

The core network node 130 and/or the processing module 801 and/or the obtaining module 840 may be configured for obtaining the indication by that the core network node 130 and/or the processing module 801 and/or the determining module 850, possibly comprised in the obtaining module 840, may be configured for determining the indication about at least one resource. The command may comprise the indication.

The core network node 130 and/or the processing module 801 and/or the obtaining module 840 may be configured for obtaining the indication by that the core network node 130 and/or the processing module 801 and/or the receiving module 810, possibly comprised in the obtaining module 840, may be configured for receiving the indication about at least one resource from the first radio network node 120. The command may comprise the indication.

The core network node 130 and/or the processing module 801 and/or the obtaining module 840 may be configured for obtaining the indication by that the core network node 130 and/or the processing module 801 and/or the receiving module 810, possibly comprised in the obtaining module 840, may be configured for receiving the indication about at least one resource from said at least one second radio network node 121-123.

As mentioned, the request may comprise at least one of:
information relating to synchronization with respect to the first radio network node 120 and/or the user equipment 110,
the indication about said at least one resource,
information relating to multiplicity of allocations for transmission of the uplink signal,
contact information relating to the first radio network node 120 for establishment of communication interface,
information relating to at least one condition for transmission of the message,
information relating to format and/or contents of the message,
an indication about a time window for transmission of the uplink signal,
an estimate of the user equipment's 110 position, and the like.

As mentioned, the command may comprise at least one of:
the information relating to synchronization with respect to the first radio network node 120 and/or the user equipment 110,
the indication about said at least one resource,
the information relating to multiplicity of allocations for transmission of the uplink signal,
the contact information relating to the first radio network node 120 for establishment of communication interface,
the information relating to at least one condition for transmission of the message,
the information relating to format and/or contents of the message,
the indication about a time window for transmission of the uplink signal,
the estimate of the user equipment's 110 position, and the like.

As mentioned, the command may comprise an indication about a sequence for representing the uplink signal and/or an indication about a time window for transmission of the uplink signal.

The core network node 130 and/or the processing module 801 and/or the forwarding module 860 may be configured for forwarding a message from none or at least one of said at least one second radio network nodes 121-123.

The core network node 130 and/or the processing module 801 and/or the transmitting module 830 may be configured for transmitting, to the first radio network node 120, a confirmation that at least one second radio network node 121-123 has been selected to listen for the uplink signal.

Figure 10:
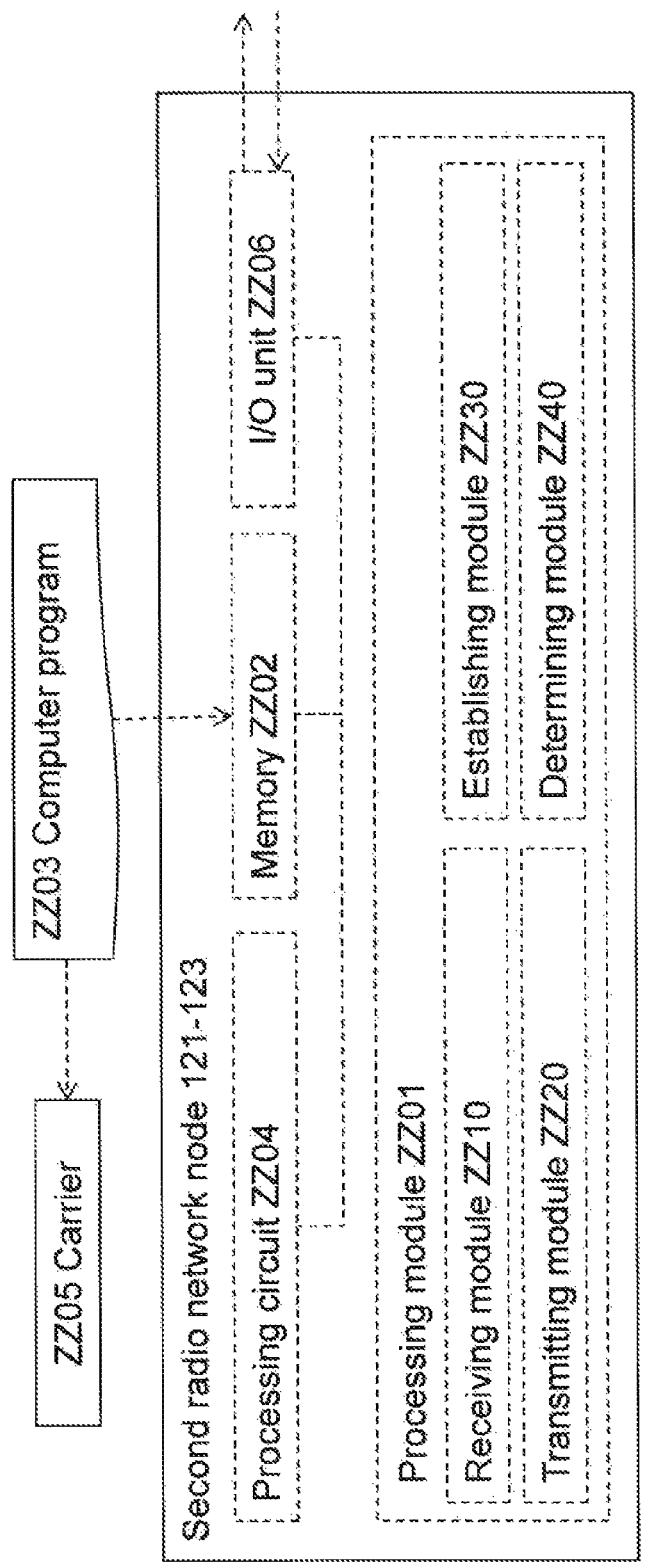
FIG. 10 is a block diagram illustrating embodiments of the second radio network node.

With reference to FIG. 10, a schematic block diagram of embodiments of the second radio network node 121-123 of FIG. 1 is shown.

The second radio network node 121-123 may comprise a processing module 1001, such as a means for performing the methods described herein. The means may be embodied in the form of one or more hardware modules and/or one or more software modules The second radio network node 121-123 may further comprise a memory 1002. The memory may comprise, such as contain or store, instructions, e.g. in the form of a computer program 1003, which may comprise computer readable code units.

According to some embodiments herein, the second radio network node 121-123 and/or the processing module 1001 comprises a processing circuit 1004, which may comprise one or more processors, as an exemplifying hardware module. Accordingly, the processing module 1001 may be embodied in the form of, or 'realized by', the processing circuit 1004. The instructions may be executable by the processing circuit 1004, whereby the second radio network node 121-123 is operative to perform the methods of FIG. 2 and/or FIG. 9. As another example, the instructions, when executed by the second radio network node 121-123 and/or the processing circuit 1004, may cause the second radio network node 121-123 to perform the method according to FIG. 2 and/or FIG. 9.

In view of the above, in one example, there is provided a second radio network node 121-123 for enabling automatic neighbour detection performed by a first radio network node 120. Again, the memory 1002 contains the instructions executable by said processing circuit 1004 whereby the second radio network node 121-123 is operative for:
receiving, from a core network node 130, a command instructing the second radio network node 121-123 to listen for an uplink signal to be transmitted by a user equipment served by the first radio network node 120,
receiving the uplink signal from the user equipment 110, and
transmitting, a message relating to whether the second radio network node 121-123 is neighbouring to the first radio network node 120.

FIG. 10 further illustrates a carrier 1005, or program carrier, which comprises the computer program 1003 as described directly above.

In some embodiments, the processing module 1001 comprises an Input/Output unit 1006, which may be exemplified by a receiving module and/or a transmitting module when applicable.

In further embodiments, the second radio network node 121-123 and/or the processing module 1001 may comprise one or more of a receiving module 1010, a transmitting module 1020, an establishing module 1030, and a determining module 1040 as exemplifying hardware modules. In other examples, one or more of the aforementioned exemplifying hardware modules may be implemented as one or more software modules.

Accordingly, the second radio network node 121-123 is configured for enabling automatic neighbour detection performed by a first radio network node 120.

Therefore, according to the various embodiments described above, the second radio network node 121-123 and/or the processing module 1001 and/or the receiving module 1010 is configured for receiving, from a core network node 130, a command instructing the second radio network node 121-123 to listen for an uplink signal to be transmitted by a user equipment served by the first radio network node 120.

The second radio network node 121-123 and/or the processing module 1001 and/or the receiving module 1010 is configured for receiving the uplink signal from the user equipment 110.

The second radio network node 121-123 and/or the processing module 1001 and/or the transmitting module 1020 is configured for transmitting, a message relating to whether the second radio network node 121-123 is neighbouring to the first radio network node 120.

As mentioned, the message may comprise an indication indicating that the uplink signal was received by the second radio network node 121-123.

The second radio network node 121-123 and/or the processing module 1001 and/or the establishing module 1030 may be configured for establishing a communication interface between the first radio network node 120 and the second radio network node 121-123, when the message indicates that the second radio network node 121-123 is neighbouring to the first radio network node 120.

As mentioned, the message may comprise an initiation of establishment of a communication interface between said first and second radio network nodes 120-123.

As mentioned, the message may comprise at least one of:
an identifier of said at least one second radio network node 121-123,
contact information relating to said at least one second radio network node 121-123 for establishment of communication interface,
an encryption certificate for verification of identity of said at least one second radio network node 121-123 and/or for establishment of communication interface and/or for encryption/integrity protection of communication interface,
a quality measure relating to the uplink signal received by said at least one second radio network node 121-123
information about a coverage area relating to said at least one second radio network node 121-123,
information about a transmit power relating to said at least one second radio network node 121-123,
information about a number of antenna sites relating to said at least one second radio network node 121-123,
information about frequency bands supported by said at least one second radio network node 121-123, and the like.

As mentioned, the command may comprise at least one of:

the information relating to synchronization with respect to the first radio network node 120 and/or the user equipment 110,
the indication about said at least one resource,
the information relating to multiplicity of allocations for transmission of the uplink signal,
the contact information relating to the first radio network node 120 for establishment of communication interface,
the information relating to at least one condition for transmission of the message,
the information relating to format and/or contents of the message,
the indication about a time window for transmission of the uplink signal,
the estimate of the user equipment's 110 position, and the like.

The second radio network node 121-123 and/or the processing module 1001 and/or the determining module 1040 may be configured for determining, based on the indication of the time window, an indication about at least one resource for transmission of the uplink signal.

The second radio network node 121-123 and/or the processing module 1001 and/or transmitting module 1020 may be configured for transmitting, to the core network node 130, an indication about at least one resource for transmission of the uplink signal.

As used herein, the term "node", or "network node", may refer to one or more physical entities, such as devices, apparatuses, computers, servers, electronic equipment or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on a set of server machines of a cloud system.

As used herein, the term "module" may refer to one or more functional modules, each of which may be implemented as one or more hardware modules and/or one or more software modules and/or a combined software/hardware module in a node. In some examples, the module may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

The terms "processing module" or "processing circuit" may herein encompass a processing unit, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the term "radio resource" may refer to a certain coding of a signal and/or a time frame and/or a frequency range in which the signal is transmitted. In some examples, a resource may refer to one or more Physical Resource Blocks (PRB) which is used when transmitting the signal. In more detail, a PRB may be in the form of Orthogonal Frequency Division Multiplexing (OFDM) PHY resource blocks (PRB). The term "physical resource block" is known from 3GPP terminology relating to e.g. Long Term Evolution Systems.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a first radio network node, for automatic neighbour detection, wherein the method comprises:
   selecting a user equipment from a group of user equipments to assist with the automatic neighbour detection,
   selecting a sequence for representing an uplink signal from a set of uplink synchronization sequences, responsive to multiple automatic neighbour detections in progress,
   transmitting a request to a core network node for initiation of the automatic neighbour detection, wherein the request comprises an indication about the sequence,
   transmitting, to the user equipment, an instruction to transmit the uplink signal, wherein the instruction comprises the indication about the sequence, and
   receiving a message relating to whether at least one second radio network node is neighbouring to the first radio network node.

2. The method according to claim 1, wherein the message comprises an indication indicating that the uplink signal was received by said at least one second radio network node.

3. The method according to claim 1, further comprising:
   receiving, from the core network node, a confirmation that at least one second radio network node has been selected to listen for the uplink signal.

4. The method according to claim 1, wherein the request comprises an indication of zero or more of said at least one second radio network node.

5. The method according to claim 1, wherein the message is received from said at least one second radio network node and/or the core network node.

6. The method according to claim 1, further comprising:
   when the message indicates that said at least one second radio network node is neighbouring to the first radio network node, establishing a communication interface between the first radio network node and said at least one second radio network node.

7. The method according to claim 1, wherein the message comprises an initiation of establishment of a communication interface between said first and said at least one second radio network nodes.

8. The method according to claim 1, wherein the message comprises at least one of:
   an identifier of said at least one second radio network node,
   contact information relating to said at least one second radio network node for establishment of communication interface,
   an encryption certificate for verification of identity of said at least one second radio network node and/or for establishment of communication interface and/or for encryption/integrity protection of communication interface,
   a quality measure relating to the uplink signal received by said at least one second radio network node,
   information about a coverage area relating to said at least one second radio network node, information about a transmit power relating to said at least one second radio network node, information about a number of antenna sites relating to said at least one second radio network node, and information about frequency bands supported by said at least one second radio network node.

9. The method according to claim 1, further comprising:
obtaining an indication about at least one resource for transmission of the uplink signal.

10. The method according to claim 9, wherein the obtaining of the indication about said at least one resource comprises:
receiving the indication about said at least one resource from the core network node.

11. The method according to claim 1, wherein the request comprises at least one of:
information relating to synchronization with respect to the first radio network node and/or the user equipment, an indication about at least one resource for transmission of the uplink signal, information relating to multiplicity of allocations for transmission of the uplink signal, contact information relating to the first radio network node for establishment of communication interface, information relating to at least one condition for transmission of the message, information relating to format and/or contents of the message, and an indication about a time window for transmission of the uplink signal.

12. The method according to claim 1, wherein the instruction instructs the user equipment to transmit the uplink signal on at least one resource.

13. The method according to claim 1, wherein selecting the user equipment from the group of user equipments to assist with the automatic neighbour detection comprises selecting the user equipment from a group of user equipments located at an edge of a cell, the cell being operated by the first radio network node.

14. A first radio network node configured for automatic neighbour detection, the first radio network node comprising a memory and a processing circuit coupled to the memory, the processing circuit configured for:
selecting a user equipment from a group of user equipments to assist with the automatic neighbour detection, selecting a sequence for representing an uplink signal from a set of uplink synchronization sequences, responsive to multiple automatic neighbour detections in progress, transmitting a request to a core network node for initiation of the automatic neighbour detection, wherein the request comprises an indication about the sequence, transmitting, to the user equipment, an instruction to transmit the uplink signal, wherein the instruction comprises the indication about the sequence, and receiving a message relating to whether at least one second radio network node is neighbouring to the first radio network node.

15. The first radio network node according to claim 14, wherein the message comprises an indication indicating that the uplink signal was received by said at least one second radio network node.

16. The first radio network node according to claim 14, wherein the processing circuit is further configured for:
receiving, from the core network node, a confirmation that at least one second radio network node has been selected to listen for the uplink signal.

17. The first radio network node according to claim 14, wherein the request comprises an indication of zero or more of said at least one second radio network node.

18. The first radio network node according to claim 14, wherein the message is received from said at least one second radio network node and/or the core network node.

19. The first radio network node according to claim 14, wherein the processing circuit is further configured for:
when the message indicates that said at least one second radio network node is neighbouring to the first radio network node, establishing a communication interface between the first radio network node and said at least one second radio network node.

20. The first radio network node according to claim 14, wherein the message comprises an initiation of establishment of a communication interface between said first and said at least one second radio network nodes.

21. The first radio network node according to claim 14, wherein the message comprises at least one of:
an identifier of said at least one second radio network node, contact information relating to said at least one second radio network node for establishment of communication interface, an encryption certificate for verification of identity of said at least one second radio network node and/or for establishment of communication interface and/or for encryption/integrity protection of communication interface, a quality measure relating to the uplink signal received by said at least one second radio network node, information about a coverage area relating to said at least one second radio network node, information about a transmit power relating to said at least one second radio network node, information about a number of antenna sites relating to said at least one second radio network node, and information about frequency bands supported by said at least one second radio network node.

22. The first radio network node according to claim 14, wherein the processing circuit is further configured for:
obtaining an indication about at least one resource for transmission of the uplink signal.

23. The first radio network node according to claim 22, wherein the obtaining of the indication about said at least one resource comprises:
receiving the indication about at least one resource from the core network node.

24. The first radio network node according to claim 14, wherein the request comprises at least one of:
information relating to synchronization with respect to the first radio network node and/or the user equipment, an indication about at least one resource for transmission of the uplink signal, information relating to multiplicity of allocations for transmission of the uplink signal, contact information relating to the first radio network node for establishment of communication interface, information relating to at least one condition for transmission of the message, information relating to format and/or contents of the message, and an indication about a time window for transmission of the uplink signal.

25. The first radio network node according to claim 14, wherein the instruction instructs the user equipment to transmit the uplink signal on at least one resource.

26. The first radio network node according to claim 14 wherein selecting the user equipment from the group of user equipments to assist with the automatic neighbour detection comprises selecting the user equipment from a group of user equipments located at an edge of a cell, the cell being operated by the first radio network node.

* * * * *